United States Patent
Armbruster et al.

(10) Patent No.: US 11,108,590 B2
(45) Date of Patent: Aug. 31, 2021

(54) NETWORK MECHANISM, NETWORK ARRANGEMENT AND METHOD FOR OPERATING A NETWORK ARRANGEMENT

(71) Applicant: Siemens Aktiengesellschaft, Munich (DE)

(72) Inventors: Michael Armbruster, Munich (DE); Ludger Fiege, Grafing (DE); Johannes Riedl, Ergolding (DE); Thomas Schmid, Nurtingen (DE); Andreas Zirkler, Munich (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 1043 days.

(21) Appl. No.: 13/906,035

(22) Filed: May 30, 2013

(65) Prior Publication Data
US 2013/0322434 A1   Dec. 5, 2013

(30) Foreign Application Priority Data
May 30, 2012   (DE) .......................... 102012209108.4

(51) Int. Cl.
*H04L 12/00* (2006.01)
*H04L 12/40* (2006.01)
*H04L 12/437* (2006.01)
*H04L 12/939* (2013.01)

(52) U.S. Cl.
CPC ...... *H04L 12/40006* (2013.01); *H04L 12/437* (2013.01); *H04L 49/55* (2013.01)

(58) Field of Classification Search
CPC ... H04L 12/4637; H04L 12/437; H04L 12/42; H04L 12/417; H04L 12/28;
(Continued)

(56) References Cited

U.S. PATENT DOCUMENTS 6,085,241 A   7/2000   Otis .............................. 709/223
7,136,290 B1   11/2006   Wise ............................. 361/788
(Continued)

FOREIGN PATENT DOCUMENTS

| CN | 101083666 A | 12/2007 | ............. H04L 12/28 |
| CN | 101800687 A | 8/2010 | ........... H04L 12/437 |

(Continued)

*Primary Examiner* — Noel R Beharry
*Assistant Examiner* — Lionel Preval
(74) *Attorney, Agent, or Firm* — Slayden Grubert Beard PLLC

(57) ABSTRACT

A network mechanism for a communication network, e.g., Ethernet environment, includes a first control mechanism with an assigned first physical port and a second control mechanism with an assigned second physical port, the first and the second physical port being configured to receive and send data via a transmission medium. The network mechanism is configured such that transmitted data from the first control mechanism are coupled by an internal transmit connector of the first control mechanism via the first physical port into the transmission medium and received data at the second physical port are routed to an internal receive connector of the first control mechanism. Alternatively, received data can be routed crosswise to the other control mechanism, i.e., the control mechanism not assigned to the receiving physical port. The crosswise routing enables the formation of two independent ring-shaped communication paths of different transmit/receive directions within a single physical ring-shaped network.

27 Claims, 20 Drawing Sheets

(58) Field of Classification Search
CPC ... H04L 12/40182; H04L 12/56; H04L 45/22; H04L 12/40006; H04L 49/55; H04J 14/0283; H04J 14/0216; H04J 2203/0042; H04J 2203/006; H04B 10/2503; H04B 10/25; H04Q 2213/13162; H04Q 2213/13166; H04Q 2213/13167; H04Q 2213/13298; G06F 11/1633; G06F 11/181; G06F 11/182
USPC ............ 370/362, 392, 404, 249; 398/83, 59; 701/59
See application file for complete search history.

(56) References Cited

U.S. PATENT DOCUMENTS

| | | | |
|---|---|---|---|
| 8,004,961 B1* | 8/2011 | Buchanan | H04L 49/357 370/216 |
| 8,149,870 B2 | 4/2012 | Yu et al. | 370/466 |
| 8,320,387 B2 | 11/2012 | Jiang et al. | 370/400 |
| 8,472,443 B2 | 6/2013 | Enduri et al. | 370/392 |
| 2005/0025489 A1* | 2/2005 | Aldridge et al. | 398/83 |
| 2005/0129037 A1* | 6/2005 | Zumsteg | H04L 12/28 370/404 |
| 2006/0116803 A1* | 6/2006 | Armbruster | G05B 9/03 701/48 |
| 2008/0118244 A1* | 5/2008 | Nakada | H04L 12/66 398/59 |
| 2010/0195660 A1 | 8/2010 | Jiang et al. | 370/400 |
| 2011/0026411 A1* | 2/2011 | Hao | H04L 12/40189 370/249 |
| 2011/0116508 A1* | 5/2011 | Kirrmann | H04L 12/437 370/392 |

FOREIGN PATENT DOCUMENTS

| | | | |
|---|---|---|---|
| CN | 102067533 A | 5/2011 | ............... G06F 3/06 |
| WO | 2013/041351 A1 | 3/2013 | ............... G06F 11/16 |

\* cited by examiner

Physical Transmission Medium

Physical Transmission Medium

Physical Transmission Medium

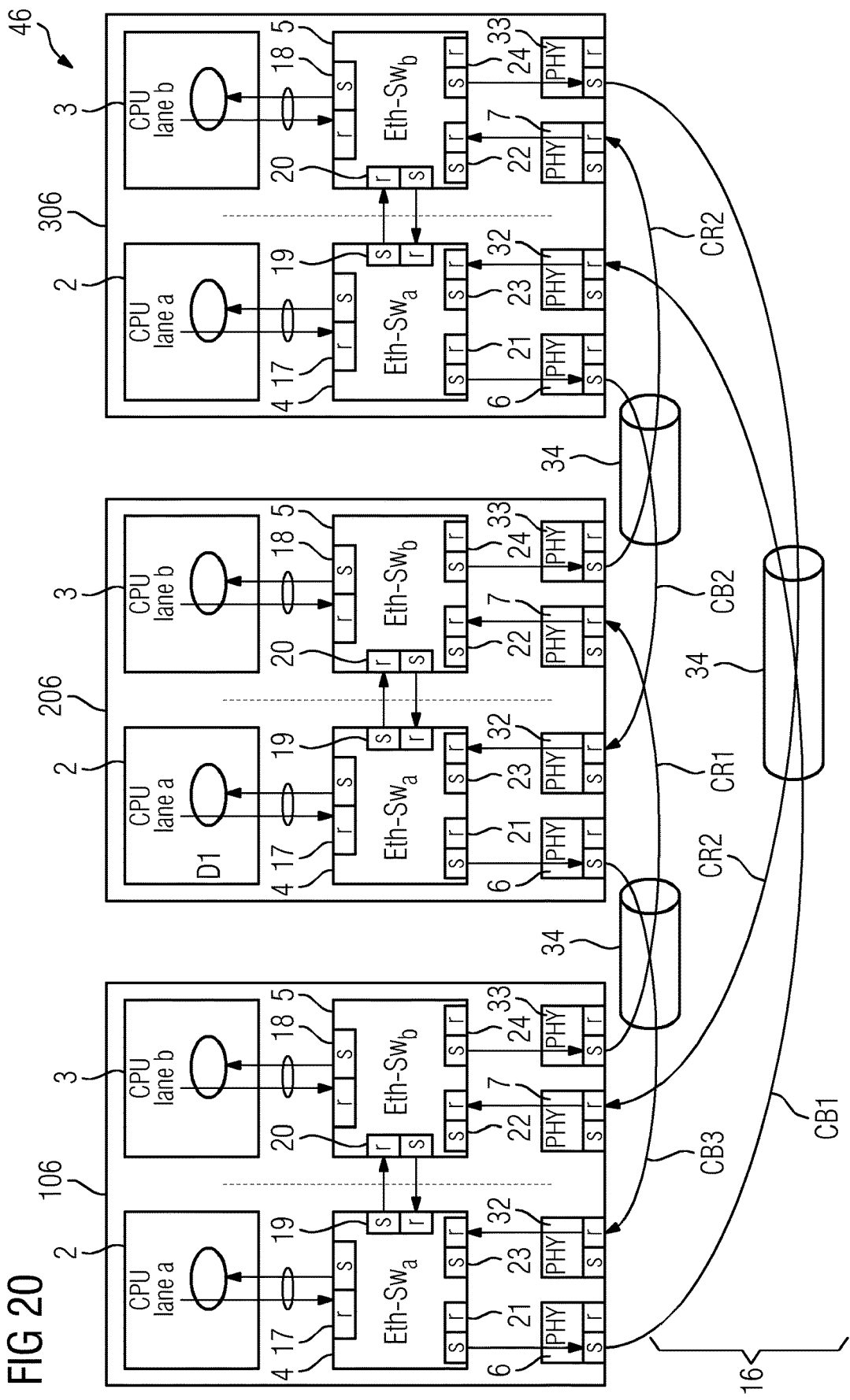

NETWORK MECHANISM, NETWORK ARRANGEMENT AND METHOD FOR OPERATING A NETWORK ARRANGEMENT

CROSS-REFERENCE TO RELATED APPLICATIONS

This application claims priority to DE Patent Application No. 10 2012 209 108.4 filed May 30, 2012. The contents of which is incorporated herein by reference in its entirety.

TECHNICAL FIELD

The present disclosure relates to a network mechanism, a network arrangement and a method for operating a network arrangement. The network mechanism and network arrangement are in particular suitable in a switched network environment, such as, for example an Ethernet environment, e.g., to establish a secure data network.

BACKGROUND

Communication networks are increasingly being used to measure, control and regulate complex technical systems. For example, networks are increasingly used in motor vehicles to form vehicle control systems. In corresponding complex and safety-relevant technical systems, high requirements are placed on the availability of the control elements provided as network mechanisms. In the event of the failure of individual components, such as, for example, sensors or control mechanisms, this must not result in the failure of the overall system. Particularly safety-relevant are drive-by-wire systems, for example steer-by-wire systems, in which the steering-wheel position is converted into wheel positions by electromotive force via a network coupling of sensor, control and actuator mechanisms.

In the past, redundant versions of particularly critical components were used, so that, in the event of an error, the respective backup or redundant component can take over the respective task. In the case of a plurality of redundant components, it is necessary to ensure that only one of the two or more control mechanisms has the respective control sovereignty. In addition, contradictory control commands must not be issued for the same control functions. It is therefore necessary for all control components to have access to the same information or data in the network.

Insofar, it is necessary for errors in the form of inconsistent data, which could, for example, be corrupted during data transmission over the network used, to be recognized. A standard network environment, which is widely used, is based on the Ethernet protocol. The use of Ethernet infrastructures has the advantage that standardized network mechanisms and methods can be used. In the past, however, proprietary data buses were also used to link control components with internal redundancy, that is with duplicated functions, to each other.

In addition, it is possible that nodes used in the network could be defective. For example, types of error are known with which one network mechanism repeatedly sends data into the network that do not contain any data that can be used by the other control mechanisms. This is also known as a "babbling idiot". The network infrastructure can be overloaded by high data rates to such an extent that genuine control or sensor data can no longer be exchanged between the still functioning network mechanisms. It is desirable in particular to deal with malfunctions of this kind in safety-relevant networks and process the data present suitably in order to ensure reliable operation of the unaffected mechanisms in the network.

In the past, methods were suggested with which the data exchange between prespecified communication partners was bandwidth-limited. However, defective network nodes can also generate data packets with incorrect address data, which, in the context of a dedicated bandwidth limitation, cannot be dealt with satisfactorily in all types of network topology, in particular not in a ring-shaped network topology.

Also known are methods based on synchronized communication between the individual network nodes. Here, specific time slots are defined for the data exchange between prespecified communication partners. Time-slot methods of this kind require complex synchronization and special hardware mechanisms.

It is therefore desirable to provide network mechanisms, which, individually or in plurality work as robustly as possible in a network arrangement or a communication network in the event of errors.

SUMMARY

One embodiment provides a network mechanism for a communication network with a first control mechanism, a second control mechanism, a first physical port, which is assigned to the first control mechanism and a second physical port, which is assigned to the second control mechanism, wherein the first and the second physical port are set up to receive data from a transmission medium and to send data, wherein the network mechanism is set up such that either transmitted data from the first control mechanism are coupled by an internal transmit connector of the first control mechanism via the first physical port into the transmission medium and received data arriving at the second physical port are routed to an internal receive connector of the first control mechanism, or that received data arriving at the first physical port are routed to an internal receive connector of the first control mechanism and transmitted data from the first control mechanism are coupled by an internal transmit connector of the first control mechanism via the second physical port into the transmission medium.

In a further embodiment, the network mechanism is further set up such that either transmitted data from the second control mechanism are coupled by an internal transmit connector of the second control mechanism via the second physical port in the transmission medium and received data arriving at the first physical port are routed to an internal receive connector of the second control mechanism, or that received data arriving at the second physical port are routed to an internal receive connector of the second control mechanism and transmitted data from the second control mechanism are coupled by an internal transmit connector of the second control mechanism via the first physical port into the transmission medium.

In a further embodiment, the network mechanism is further set up such that received data arriving at the first physical port do not go to the internal receive connector of the first control mechanism.

In a further embodiment, the network mechanism is further set up such that received data arriving at the second physical port do not go to the internal receive connector of the second control mechanism.

In a further embodiment, a respective physical port comprises an external transmit connector and an external receive connector, wherein the external receive connector of the first physical port is connected directly to the internal receive connector of the second control mechanism.

In a further embodiment, a respective physical port comprises an external transmit connector and an external receive connector, wherein the external receive connector of the second physical port is connected directly to the internal receive connector of the first control mechanism.

In a further embodiment, a respective physical port comprises an external transmit connector and an external receive connector, wherein the external transmit connector of the first physical port is connected directly to the internal transmit connector of the second control mechanism.

In a further embodiment, a respective physical port comprises an external transmit connector and an external receive connector, wherein the external transmit connector of the second physical port is connected directly to the internal transmit connector of the first control mechanism.

In a further embodiment, the network mechanism further includes a first and a second switch mechanism, wherein a respective switch mechanism comprises a plurality of switch ports, wherein a respective switch port comprises an internal transmit connector and an internal receive connector and the first switch mechanism with a switch port is communicatively coupled to the first control mechanism and the second switch mechanism with a switch portis communicatively coupled to the second control mechanism.

In a further embodiment, a respective physical port comprises an external transmit connector and an external receive connector and the external receive connector of the first physical port is coupled to an internal receive connector of a switch port of the second switch mechanism.

In a further embodiment, a respective physical port comprises an external transmit connector and an external receive connector and the external receive connector of the second physical port is coupled to an internal receive connector of a switch port of the first switch mechanism.

In a further embodiment, a respective physical port comprises an external transmit connector and an external receive connector and the external transmit connector of the first physical port is coupled to an internal transmit connector of a switch port of the second switch mechanism.

In a further embodiment, a respective physical port comprises an external transmit connector and an external receive connector and the external transmit connector of the second physical port is coupled to an internal transmit connector of a switch port of the first switch mechanism.

In a further embodiment, at least one internal transmit connector of a switch port of a switch mechanism is coupled to a receive connector of a switch port of the same switch mechanism.

In a further embodiment, at least one switch mechanism is set up such that data received at an internal receive connector of the switch port are sent to the internal transmit connector of the same switch port.

In a further embodiment, the first switch mechanism and the second switch mechanism are in each case communicatively coupled to each other with the aid of a switch port.

In a further embodiment, at least one switch mechanism is set up to route data received by the control mechanism communicatively coupled to the switch port at an internal receive connector of the switch port to an internal transmit connector of a switch port of the at least one switch mechanism, which is connected to an internal receive connector of a switch port of the other switch mechanism or an internal receive connector of the other control mechanism.

In a further embodiment, the internal receive connector and the internal transmit connector of the at least one switch mechanism belongs to the same switch port of the at least one switch mechanism.

In a further embodiment, the first and the second control mechanism each comprise a further internal transmit connector and an internal receive connector, wherein the control mechanisms are directly communicatively connected to each other.

In a further embodiment, the first control mechanism is set up to generate first data and the second control mechanism is set up to generate second data wherein the first data and the second data are linked to each other by a prespecified coding.

In a further embodiment, a control mechanism, a switch mechanism and a physical port in each case form an individual integrated circuit or a module.

In a further embodiment, the external transmit connector and/or the external receive connector is set up to attach at least one twisted-pair cable.

In a further embodiment, the physical port is set up to attach at least one optical waveguide.

In a further embodiment, the network mechanism is set up for use in an Ethernet protocol environment, in particular according to the IEEE 802.3 Standard, in particular in a switched network.

Another embodiment provides a network arrangement with a plurality of network mechanisms as disclosed above, wherein the network mechanisms in each case comprise a first control mechanism and a first physical port assigned to the first control mechanism and a second control mechanism and second physical port assigned to the second control mechanism, wherein to form a ring structure each first physical port assigned to a first control mechanism in a first network mechanism is communicatively coupled with the aid of a transmission medium to a physical port assigned to a second control mechanism in a second network mechanism.

In a further embodiment, at least two network mechanisms of the network arrangement in each case comprise a first physical port, which is assigned to the first control mechanism for sending data, a further first physical port, which is assigned to the first control mechanism for receiving data, a second physical port, which is assigned to the second control mechanism for receiving data to, and a further second physical port, which is assigned to the second control mechanism for sending data, wherein the first physical port of a first network mechanism is coupled to a first further physical port of a second network mechanism and a second further physical port of the second network mechanism is coupled to a second physical port of the first network mechanism.

Another embodiment provides a method for operating a network arrangement as disclosed above, wherein in a respective network mechanism at the first physical port of the network mechanism, data received by the transmission medium are rerouted to the second physical port and sent from the second physical port to the transmission medium.

In a further embodiment, the method further comprises: the generation of first data by the first control mechanism and of second data by the second control mechanism, wherein the first data and the second data are linked to each other by a prespecified coding; the transmission of the first data from the first control mechanism to the second control mechanism and the transmission of the second data from the second control mechanism to the first control mechanism; sending the first data and the second data via a first communication path from the physical port of the first control mechanism to the physical port of the second control mechanism; sending the first data and the second data via a second communication path from the physical port of the second control mechanism to the physical port of the first control mechanism; wherein the data of the first and of the second communication paths travel through the same network mechanisms in opposite directions.

In a further embodiment, the method further comprises the comparison of the first data with the second data in the first and/or second control mechanism for the generation of a comparison result; and passivation of the network mechanism as a function of the comparison result.

Another embodiment provides a computer program product, which initiates the performance of any of the methods disclosed above on one or more program-controlled mechanisms.

Another embodiment provides a data carrier with a stored computer program with commands, which initiates the performance of any of the methods disclosed above on one or more program-controlled mechanisms.

BRIEF DESCRIPTION OF THE DRAWINGS

Exemplary embodiments will be explained in more detail below based on the schematic drawings, wherein:

FIGS. 9-20 are schematic representations of embodiments of a network arrangement with communication procedures to explain procedural aspects for the operation of the same.

DETAILED DESCRIPTION

Figure 1:
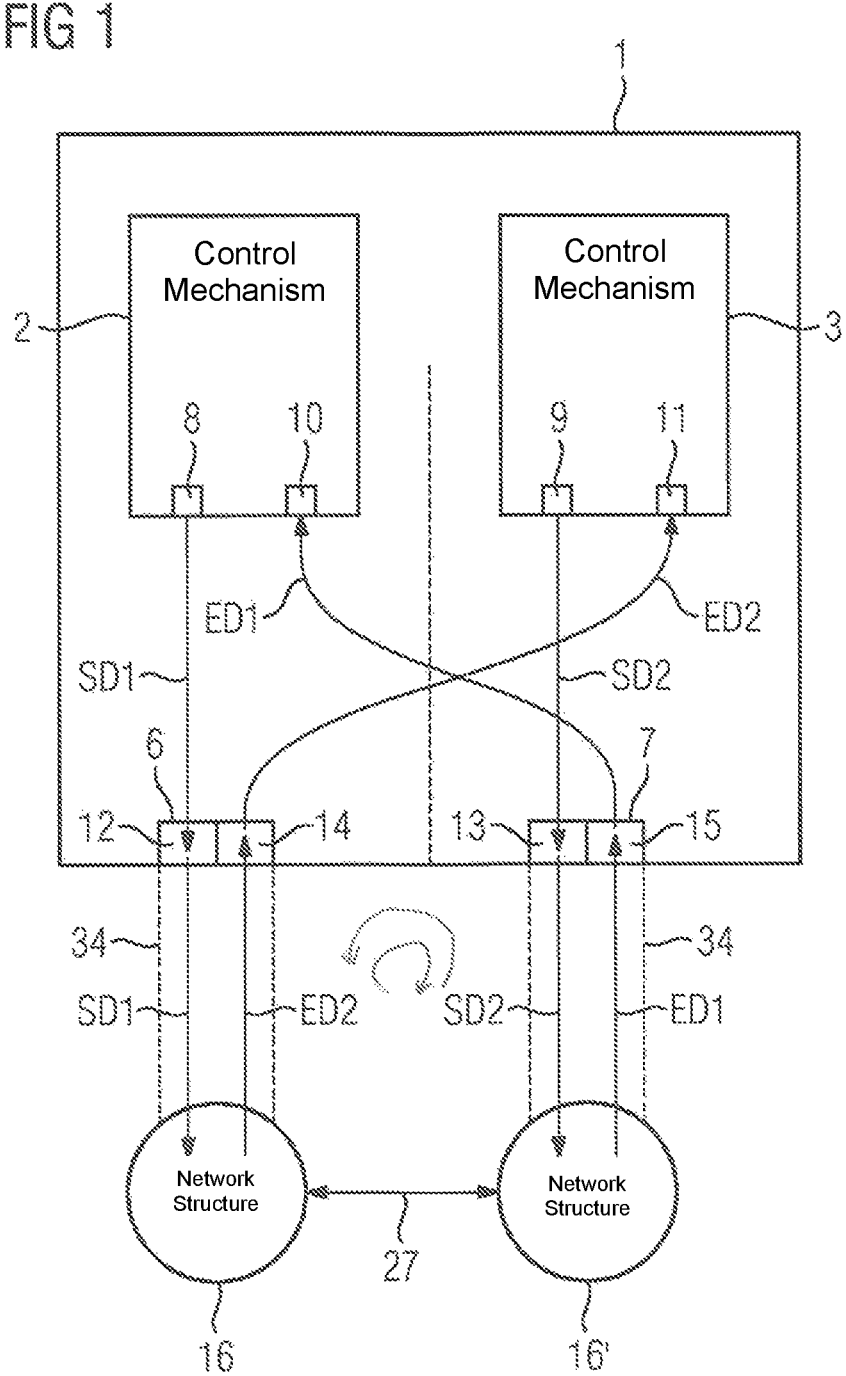
FIGS. 1-8 are schematic representations of embodiments of network mechanisms.

Embodiments of the present invention may provide an improved network mechanism, a network arrangement and/or a method for operating network arrangements or communication networks.

Accordingly, a network mechanism for a communication network with a first control mechanism, a second control mechanism, a first physical port, which is assigned to the first control mechanism, and a second physical port, which is assigned to the second control mechanism, are suggested. Here, the first and the second physical port are set up to receive data from a transmission medium and to send data. The network mechanism is set up such that transmitted data from the first control mechanism are coupled by an internal transmit connector of the first control mechanism via the first physical port into the transmission medium and received data arriving at the second physical port are routed to an internal receive connector of the first control mechanism.

An alternative embodiment of a network mechanism for a communication network comprises a first control mechanism, a second control mechanism, a first physical port, which is assigned to the first control mechanism and a second physical port, which is assigned to the second control mechanism, wherein the first and the second physical port are set up to receive data from a transmission medium and to send data. The network mechanism is set up such that received data arriving at the first physical port are routed to an internal receive connector of the first control mechanism and transmitted data from the first control mechanism are coupled by an internal transmit connector of the first control mechanism via the second physical port into the transmission medium.

The network mechanisms can, for example, be sensor mechanisms or actuator mechanisms. Conceivable sensor mechanisms are speed sensors, braking or shift-control mechanisms. It is also possible to use control devices as network mechanisms, which, for example, enable drive-by-wire. Here, for example, steering or acceleration pulses are transmitted electronically over the network to corresponding actuators to achieve the desired reaction of the vehicle. The first and second control mechanisms are, as a rule, suitable for generating data which are used or generated by sensors or control algorithms.

The network mechanisms are preferably embodied in each case as an individual FPGA, ASIC, IC chip or hardwired microcircuit. An embodiment is also possible in each case as a chip which implements the control mechanism and a switch with the physical port. It is also possible to produce modules comprising a CPU, switch and port with plug-in connection.

Possible control mechanisms to be provided in the network mechanisms are, for example a CPU, a microprocessor or also other programmable circuits. In addition, a sensor or actuator mechanism could also be understood to be a control mechanism.

The network mechanism in particular enables use in a switched network. The communication network or transmission medium can in particular comprise an Ethernet environment.

A physical port or PHY port is preferably assigned to the physical layer of the OSI layer model. A physical port is deemed, for example, to be a connecting element between the OSI-MAC layer and a physical medium, such as an optical fiber or a copper cable or network cable for data transmission. In an Ethernet environment, a physical port is, for example, integrated in a PHYceiver. Here, the physical port enables the coupling of the physical network infrastructure with the aid of a cable or other transmission medium to the link layer and in particular the media-access control layer (MAC). Here, a physical port should in particular mean a connecting element between the physical layer (OSI Layer 1) and the data link layer (OSI layer 2).

The suggested network mechanism enables crossover data transmission. For example, data sent or generated by the first control mechanism are coupled via the second port or the external transmit connector thereof into the transmission medium. At the same time, transmitted data or generated data are coupled by the second control mechanism via the first physical port to the transmission medium. This crossover linking, which, can, for example, take place within the network mechanism via a circuit or wiring, enables the establishment of a ring-shaped network arrangement with a plurality of network mechanisms. This results in virtually independent communication paths occupied by consistent data in a single ring-shaped physical network. Overall, this results in a particularly robust network arrangement with which even faulty control mechanisms in a network can be managed and nevertheless consistent data can be present in the network.

Some embodiments of the network mechanism envisage that the network mechanism is set up such that transmitted data from the second control mechanism are coupled by an internal transmit connector of the second control mechanism via the second physical port into the transmission medium and received data arriving at the first physical port are routed to an internal receive connector of the second control mechanism. Alternatively, the network mechanism is set up such that received data arriving at the second physical port is routed to an internal receive connector of the second control mechanism and transmitted data from the second control mechanism is coupled by an internal transmit connector of the second control mechanism via the first physical port into the transmission medium.

Hence, it is possible, depending upon the embodiment of the network arrangement, to crossover the transmit paths within the network mechanism or also to crossover the receive paths. It is, on the one hand, conceivable, to couple the transmitted data generated by the first control mechanism via the second physical port into the transmission medium and simultaneously to transmit the transmitted data of the second control mechanism via the first physical port. However, at the same time, the received data are supplied to the first physical port of the first control mechanism and the received data at the second physical port for the second control mechanism.

In the alternative solution, the received data are routed crosswise within the network mechanism. I.e., the received data arriving at the first physical port are supplied internally to the second control mechanism and the received data present at the second physical port to the first control mechanism. However, simultaneously the transmitted data of the first control mechanism is transmitted via the first physical port and the transmitted data from the second control mechanism via the second physical port.

This gives rise to the possibility, in particular in a ring-shaped arrangement of the network mechanisms, of implementing two communication paths which are independent of each other with different communication directions.

In some embodiments of the network mechanism, the network mechanism is set up such that received data arriving at the first physical port do not go to the internal receive connector of the first control mechanism. Furthermore, the network mechanism can be set up such that received data arriving at the second physical port do not go to the internal receive connector of the second control mechanism.

In an alternative crossover routing of data to be transmitted, the network mechanism is preferably set up such that data sent by the internal transmit connector of the first control mechanism do not go to the first physical port. Furthermore, it is conceivable that data sent from the internal transmit connector of the second control mechanism do not go to the second physical port.

In some embodiments of the network mechanism, a respective physical port comprises an external transmit connector and an external receive connector. Here, the external receive connector of the first physical port is directly connected to the internal receive connector of the second control mechanism. The direct connection can, for example, be implemented by a track conductor or another physical linking of the externally attachable physical port of the network mechanism.

In further embodiments of the network mechanism, a respective physical port comprises an external transmit connector and an external receive connector, wherein the external receive connector of the second physical port is directly connected to the internal receive connector of the first control mechanism.

Alternatively to the two aforementioned configurations of direct connections between physical ports or the external connectors thereof to the internal connectors of the control mechanism, a physical port comprising an external transmit connector and an external receive connector can be embodied such that the external transmit connector of the first physical port is directly connected to the internal transmit connector of the second control mechanism.

It is furthermore possible for, in some embodiments of the network mechanism, a respective physical port comprising an external transmit connector and an external receive connector to be connected internally such that the external transmit connector of the second physical port is directly connected to the internal transmit connector of the first control mechanism.

In further embodiments, the network mechanism comprises a first and a second switch mechanism, wherein a respective switch mechanism has a plurality of switch ports. A respective switch port comprises an internal transmit connector and an internal receive connector. The first switch mechanism is communicatively coupled with the aid of a switch port to the first control mechanism and the second switch mechanism is communicatively coupled with the aid of a switch port to the second control mechanism.

The supply or the routing or switching of the received and/or transmitted data can take place between the respective control mechanism and the assigned physical ports for example with the aid of assigned switch mechanisms. Switch mechanisms can also provide the data traffic between control mechanisms. A part of the network mechanism can be present as a combination of control mechanism, switch mechanism and physical port in the form of a module or also of an individual integrated circuit or chips.

In some embodiments of the network mechanism, a respective physical port comprises an external transmit connector and an external receive connector. In the case of switch mechanisms, the external receive connector of the first physical port is coupled to a receive connector of a switch port of the second switch mechanism. Insofar, crossover communication takes place with the aid of the switch mechanisms. Here, with respect to received data or transmitted data, the physical port assigned to the first control mechanism is linked to the other switch mechanism, for example, by a direct track conductor or connection.

In some embodiments of the network mechanism, with which a respective physical port comprises an external transmit connector and an external receive connector, the external transmit connector of the first physical port is coupled to an internal transmit connector of a switch port of the second switch mechanism. It is also conceivable for the external transmit connector of the second physical port to be coupled to an internal transmit connector of a switch port of the first switch mechanism.

In conventional configurations, an internal switch port of a first switch mechanism is connected to an external transmit connector of the first physical port. The above-described linking or cabling, for example, in the form of track conductors on a carrier, enables crossover interconnection and hence crossover data transmission.

In further embodiments, at least one internal transmit connector of a switch port of a switch mechanism is coupled to a receive connector of a switch port of the same switch mechanism.

It is, for example, possible for a switch mechanism used to be programmed or set up such that only in the case of simultaneous allocation or supply of switch ports with data do they function reliably. In the case of an internal connection of a transmit connector to a receive connector, it is, for example, suggested, independently of the data of a standard switch mechanism transmitted, that all connectors of the switch port are occupied.

It is also possible for, in some embodiments of the network mechanism, at least one switch mechanism to be set up such that data received at one receive connector of the switch port are sent to the internal transmit connector of the same switch port. Suitable programming of a routing table within the switch mechanism enables, for example, a configuration of this kind to be achieved. Usually, switch mechanisms are programmed differently and block the output of data to a transmit connector of the switch port, which has also received the data. With the present embodiments, on the other hand, a configuration of this kind is, for example, desirable.

In further embodiments of the network mechanism, the first switch mechanism and the second switch mechanism are communicatively coupled to each other with the aid of a switch port in each case. Coupling the switch mechanisms to each other enables, for example, a further data exchange between the two control mechanisms without having to use the communication medium to which the physical ports are coupled. In particular, suitable routing within the switch mechanisms enables data generated by the first control mechanism to be compared with data generated by the second control mechanism. Insofar, a consistency check can be performed.

Data transmission between the two switch mechanisms is preferably bandwidth-limited. This means that, in all single-fault situations of parts of network mechanisms, reliable redundant data provision can still take place over at least one of two physically independent directions within a single ring-shaped network.

Further embodiments of the network mechanism provide that at least one switch mechanism is set up to route data received by the control mechanism communicatively coupled to the switch port at an internal receive connector of the switch port to an internal transmit connector of the switch port of the at least one switch mechanism, which is connected to an internal receive connector of a switch port of the other switch mechanism.

Alternatively, data received at an internal receive connector of the switch port can be routed by the control mechanism communicatively connected to the switch port to an internal transmit connector of a switch port of the at least one switch mechanism, which is connected to an internal receive connector of the other control mechanism.

It is for example conceivable, in order to provide all transmit and receive connectors of the switch mechanisms with data traffic, to occupy any possibly unused transmit and receive connectors due to the crossover data transmission between the first control mechanism and the second physical port or the second control mechanism and the first physical port with dummy or filler data.

It is conceivable for the internal receive connector and the internal transmit connector of the at least one switch mechanism to belong to the same switch port of the at least one switch mechanism. Insofar, it is also possible for a switch mechanism to be cabled or wired such that transmitted or received data are sent to themselves in order fully to exploit the connectors of the switch ports.

In some embodiments of the network mechanism, the first and the second network mechanism in each case have a further internal transmit connector and an internal receive connector. Here, the control mechanisms are directly communicatively connected to each other. For example, the internal transmit connector of the first control mechanism can be directly coupled or connected to an internal receive connector of the second control mechanism. Insofar, data comparison directly between the control mechanisms is conceivable.

It is also possible for the network mechanism to be embodied such that the first control mechanism generates first data and the second control mechanism generates second data. Here, the first data and the second data are preferably linked to each other by a prespecified coding. Insofar, it is possible to check by comparing the first and second data whether the data contents are compatible with each other or the same.

For example, in the case of control mechanisms that are used in vehicle control systems, the control mechanisms generate redundant control data or sensor data. These are sent redundantly in a corresponding network arrangement comprising at least two independent communication paths. If a control mechanism fails or is faulty or, for example, as a babbling idiot generates an excessive amount of meaningless data, this can be detected by a comparison of the data. Moreover, in the event of a faulty control mechanism or switch mechanism, the crossover communication enables a physical separation of the communication paths so that protected data communication can still take place within the network.

The control mechanism and the associated switch mechanism and the physical port preferably form an individual integrated circuit or a module with potentially further components, such as memory modules. Insofar, the network mechanism can be constructed from, for example, two integrated circuits or chips or modules produced in the standard way. The network mechanism then forms a module from two chips or modules of this kind, which are linked physically to each other in a suitable way, for example by track conductors.

In some embodiments of the network mechanism, the physical port or ports are equipped with a transmit and/or receive connector for attaching in each case at least one twisted-pair cable. Twisted-pair cables are, for example, used as standard in Ethernet applications and networks, so that simple use and simple implementation of the network mechanism and cabling as a network arrangement is possible. However, it is also conceivable for the network mechanism to be embodied such that the physical port is set up to attach at least one optical waveguide. In addition, physical port embodiments are also conceivable, for example for attaching wireless networks.

Preferably, the network mechanism is in particular set up for use in an Ethernet protocol environment for example according to an IEEE 802.3 Standard. The network mechanism is preferably embodied for use in a switched network.

Also suggested is a network arrangement with one or more network mechanisms, as described above. A respective network mechanism comprises in each case a first control mechanism and a first physical port assigned to the first control mechanism and a second control mechanism and a second physical port assigned to the second control mechanism. To form a ring structure, each physical port assigned to a first control mechanism in a first network mechanism with the aid of a transmission medium is communicatively coupled to a physical port assigned to a second control mechanism in a second network mechanism.

Hence, this results in a ring structure between physical ports, which are, for example, linked to each other via network cables. A ring structure is obtained, the communication paths, which go in different directions to each of the network mechanisms in a ring shape. This results in a first send direction through the physical ports and to the control mechanisms and a second opposite send direction also via the physical ports. Due to the crossover communication within the network mechanisms, even in the event of a failure or error in one of the control mechanisms, for example as a babbling idiot, the communication of the redundantly provided control mechanisms with the other network mechanisms can be continued via the further redundant data path.

A network, in particular embodied as an Ethernet communication network, results for example in a ring-shaped embodiment or the coupling of the network mechanisms with each other. The redundant design of the network mechanism with duplicate switch and control mechanisms and the facilitation of internal communication in the respective network mechanism offers secure and reliable data transport in the communication network.

In one embodiment of the network arrangement, at least two network mechanisms each have a first physical port, which is assigned to the first control mechanism for sending data, a further first physical port, which is assigned to the first control mechanism for receiving data, a second physical port, which is assigned to the second control mechanism for receiving data and a further second physical port, which is assigned to the second control mechanism for sending data. Here, the first physical port of a first network mechanism is coupled to a first further physical port of a second network mechanism. A second further physical port of the second network mechanism is coupled to a second physical port of the first network mechanism. A corresponding coupling can, for example, be achieved by crossover cabling outside the network mechanisms. For example, a special embodiment of twisted-pair cables and a corresponding embodiment or programming of the network mechanisms is conceivable.

The communication network can itself comprise an Ethernet infrastructure. The optional switch mechanisms can also be described as bridge or router mechanisms. Network mechanisms are also referred to as network nodes, network components or network elements.

The network arrangement is in particular part of a vehicle.

Also suggested is a method for operating a network arrangement as indicated above. Here, in a respective network mechanism, data received at the first physical port of the network mechanism is rerouted by the transmission medium to the second physical port and sent from the second physical port to the transmission medium.

As described above, implementation of the method with network mechanisms or a network arrangement enables reliable and redundant provision of, for example, sensor data in the network.

The method can further comprise at least one of the following procedural steps:
 the generation of first data by the first control mechanism and of second data by the second control mechanism. Here, the first data and the second data are linked to each other by a prespecified coding;
 the transmission of the first data from the first control mechanism to the second control mechanism, and the transmission of the second data from the second control mechanism to the first control mechanism;
 sending the first data and the second data via a first communication path from the physical port of the first control mechanism to the physical port of the second control mechanism; and/or
 sending the first data and the second data via a second communication path from the physical port of the second control mechanism to the physical port of the first control mechanism.

Here, the data in the first and the second communication path preferably travel through the same network mechanisms in opposite directions.

Conceivable types of coding are different logical links between the data contents of the first and second data. The first and second data, which are linked to each other via a prespecified coding, can for example be generated by bit-inversion. The prespecified coding permits a consistency check of the two types of data. If, for example, the data transfer over the network disrupts one of the data (packets), this can be identified by comparison with the respective other data (packet) taking into account the respective coding.

Embodiments of the method also comprise comparison of the first data with the second data in the first and/or second control mechanism for the generation of a comparison result and passivation of the network mechanism as a function of the comparison result.

If, for example, the first and second data are found to be incongruent, it can be detected in the network arrangement that at least one of the control mechanisms or switch mechanisms and/or the transmission channels is working defectively. The redundant embodiment of the data communication enables control mechanisms to passivate themselves and hence no longer deliver faulty data into the network. Nevertheless, the secure provision of data is still reliably possible.

The uncoded or coded data are hence sent from a first channel, emanating from a first control mechanism to a channel which is assigned to the second control mechanism. The reverse also takes place enabling the transmitting control component to determine whether the respective other channel, which is assigned to the second (redundant) control mechanism has the same data result. Insofar, it is possible to determine whether the assigned Ethernet switches or the switch mechanisms are functioning reliably. If it is recognized that at least one of the switch mechanisms assigned to the control mechanism is acting defectively, preferably the transmitting control mechanism passivates itself.

Also suggested is a computer program product which initiates the execution of the method as explained above for operating a network arrangement on one or more program-controlled mechanisms.

A computer program product, such as a computer program means, can, for example, be provided or supplied as a storage medium, such as a memory card, USB stick, CD-ROM, DVD or even in the form of a downloadable file from a server in a network. This can, for example, take place in a wireless communication network by the transmission of a corresponding file with the computer program product or the computer program means. A network mechanism as described above is particularly suitable as a program-controlled mechanism.

In addition, some embodiments also comprise non-explicitly cited combinations of procedural steps, features or embodiments of the method, the network arrangement, the network mechanism or a network node as described above or in the following with reference to the exemplary embodiments. Here, the person skilled in the art will also add or modify individual aspects as improvements or additions to the respective basic form of the invention.

FIG. 1 is a schematic representation of an embodiment of a network mechanism 1, which is in particular suitable, in a switched network environment, such as, for example, an Ethernet protocol environment, in particular in accordance with IEEE 802.3.

The network mechanism 1 is equipped with redundant, that is two, control mechanisms 2, 3. The control mechanisms 2, 3 can be implemented as microcontrollers or also sensor mechanisms and are used, for example, in an automation system or a vehicle control system for the execution of prespecified programmed tasks. For example, the control mechanism 2, 3 can be a microcontroller which calculates specific manipulated values for example for actuators in the vehicle and provides them in the network.

The network mechanism 1 is equipped with a first physical port 6 and a second physical port 7. The first physical port 6 is assigned to the first control mechanism 2, and the second physical port 7 is assigned to the second control mechanism 3. The physical ports 6, 7 enable connection to a physical network structure 16, 16'. Here, the respective physical port 6, 7 has external transmit connectors 12, 13 and external receive connectors 14, 15. The transmit connectors 12, 13 are used to couple data SD1, SD2 via a physical link in the respective transmission medium 16, 16'. This can, for example be network cables 34. However, other physical transmission media such as fiber-optic conductors or radio are also conceivable. FIG. 1 indicates the linking of the transmission media 16, 16' by the double arrow 27. Overall, a ring-shaped network structure can result if a plurality of network mechanisms 1 is coupled together. When used in Ethernet structures, only a ring structure of Ethernet cables is required, wherein two communication ring directions result. In the figures, this is indicated by the arrows. For example in each case a cable 34 is plugged into the physical port 6, 7, wherein the cables permit bidirectional data transmission.

In the embodiment shown in FIG. 1, the first control mechanism 2 has an internal transmit connector 8 and an internal receive connector 10. The second control mechanism 3 has an internal transmit connector 9 and an internal receive connector 11. Within the network mechanism 1, transmitted data SD1, which are applied by the first control mechanism 2 to the internal transmit connector 8, are routed to the external transmit connector 12 of the first physical port 6. From there, the transmitted data SD1 go to the respective transmission medium 16.

The second control mechanism 3 can also generate transmitted data SD2, which are routed from the internal transmit connector 9 to the external transmit connector 13 of the second physical port 7. In conventional network mechanisms, which can also be equipped with redundant control mechanisms 2, 3, the received data at the first physical port are generally supplied to the first control mechanism and the data received at the second physical port are routed to the second control mechanism.

In the embodiment of the present network mechanism 1, within the network mechanism, the external receive connector 14 of the first physical port 6 is connected to the internal receive connector 11 of the second control mechanism 3. Received data ED2, which arrive from the transmission medium 16 at the external receive connector 14, therefore go to the second control mechanism 3 as received data ED2.

Within the network mechanism, data ED1 received at the second external receive port 15 data go to the first control mechanism 2. Therefore, the external receive port 15 of the second physical port 7 is connected to the internal receive connector 10 of the first control mechanism 2.

The respective connection between the connectors 8 and 6, 9 and 13, 14 and 11 and 15 and 10 is provided, for example, via hard wiring within the network mechanism 1. The wiring or coupling can take the form of track conductors or wires that are suitable for the respective physical transmission of the data SD1, ED1, SD2, ED2. With one embodiment of a network mechanism 1, such as that shown in FIG. 1, a network arrangement with independent ring-shaped communication paths can be established within a single ring-shaped physical communication network.

Figure 9:
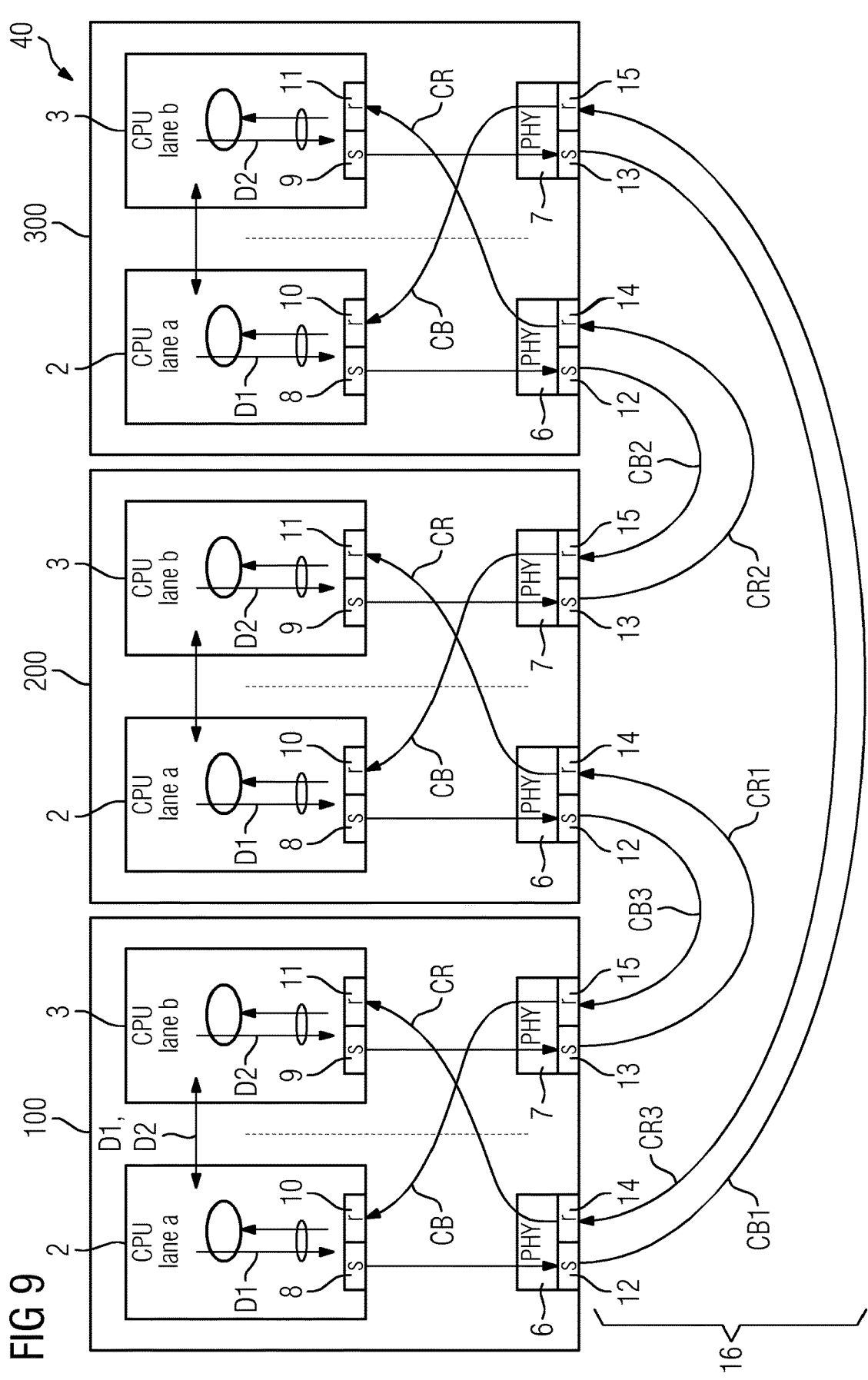

FIG. 9 shows a schematic representation of an embodiment of a network arrangement which is established with network mechanisms, as shown in FIG. 1. A corresponding network arrangement 40 or a communication network can, in particular on an Ethernet basis, comprise a plurality of network mechanisms 100, 200, 300 coupled in a ring. The network mechanisms 100, 200, 300 substantially have the same design and have a configuration and equipment similar to those shown in FIG. 1. In addition, direct communication is possible in each case between the two control mechanisms 2, 3 of a network mechanism 100, 200, 300. This enables data between the two control mechanisms 2, 3 to be checked for consistency.

In principle, the data contents which are generated by the control mechanisms 2 and 3 should be the same. Hence, redundant data or control data generation is created which provides increased security in the network 40. Each of the network mechanisms 100, 200, 300 has two control mechanisms or CPUs 2, 3, which in each case have internal transmit and receive connectors 8, 9, 10, 11. The transmit and receive connectors 8, 9, 10, 11 can, for example, be pads or electrical connectors of a microcontroller module.

In addition, each network mechanism 100, 200, 300 has physical ports 6, 7. The physical ports 6, 7 are used for attachment to a physical network infrastructure 16, which can, for example, consist of wiring by means of network cables. Here, each physical port 6, 7 has transmit connectors 12, 13 and receive connectors 14, 15. The network mechanisms 100, 200, 300 are connected to each other such that two rings that work independently of each other are formed within a single physical ring-shaped network.

A first communication path structure is produced by the coupling of the first external transmit connector 12 of the physical port 6, which is assigned to the first control mechanism 2 in the first network mechanism 100, to the external receive connector 15 of the second physical port 7, which is assigned to the second control mechanism 3 of the third network mechanism 300. This branch is designated CB1. The communication ring is continued by the connection of the external transmit connector 12 of the first physical port 6, which is assigned to the first control mechanism 2 of the third network mechanism 300, to the external receive connector 15 of the second physical port 7, which is assigned to the second control mechanism 3 of the second network mechanism 200. This branch is designated CB2. The ring is closed by a connection of the external transmit connector 12 of the first physical port 6, which is assigned to the first control mechanism 2 of the second network mechanism 200, to the external receive connector 15 of the second physical port 7, which is assigned to the second control mechanism 3 of the first network mechanism 100. This branch is designated CB3.

Branches CB1, CB2 and CB3 result in a ring-shaped communication path. Only first control mechanisms 2 of the network mechanisms 100, 200, 300 participate in the ring-shaped communication path CB1, CB2, CB3, which can also be designated lane A.

Suitable coupling of the other transmit and receive connectors 13, 14 of the physical ports 6, 7 results in a second ring, which can be designed lane B, between the second control mechanisms 3 of the network mechanisms 100, 200, 300. This ring is made up of the segments CR1, CR2 and CR3 and indicated in FIG. 9. The communication direction of the two rings or lane A or lane B have the opposite orientation. The crosswise coupling of the received data, as shown in FIG. 1 results in quasi independent rings or lanes A or B within a single physical ring-shaped network. The parts of the communication rings within the network mechanisms 100, 200, 300 are designated CB for the "blue" Lane A and CR for the "red" lane B.

In the embodiment in FIG. 9, no additional switch mechanisms or router mechanisms are provided in the network mechanisms 100, 200, 300. Hence, the control mechanisms or microcontrollers 2, 3 take over tasks, such as, for example, the selection or filtering of received data packets or monitoring of the data rates on the respective network communication rings. Saving on corresponding switches means there are fewer error sources.

Direct communication between the control mechanisms 2, 3 of a respective network mechanism 100, 200, 300 enables a consistency check on data, which is present in the lane or the respective communication ring A or B. For example, in one implementation of the first network mechanism 100 as a sensor, the CPUs 2, 3 generate the same data contents, which are, for example, connected logically to each other via bit inversion.

The data are transmitted into network 16 and are hence present redundantly and separately from each other in the ring CB1, CB2, CB3 and independently thereof in the ring CR1, CR2, CR3, wherein the two rings are implemented by the directions in a single physical ring-shaped duplex network. If, for example, a CPU in the network 40 supplies faulty data or, for example, occurs as a babbling idiot, due to the physical decoupling of the two communication rings, only one of the ring directions or lanes is affected. Nevertheless, data in the respective other ring direction are in each case reliably present in the network.

Figure 2:
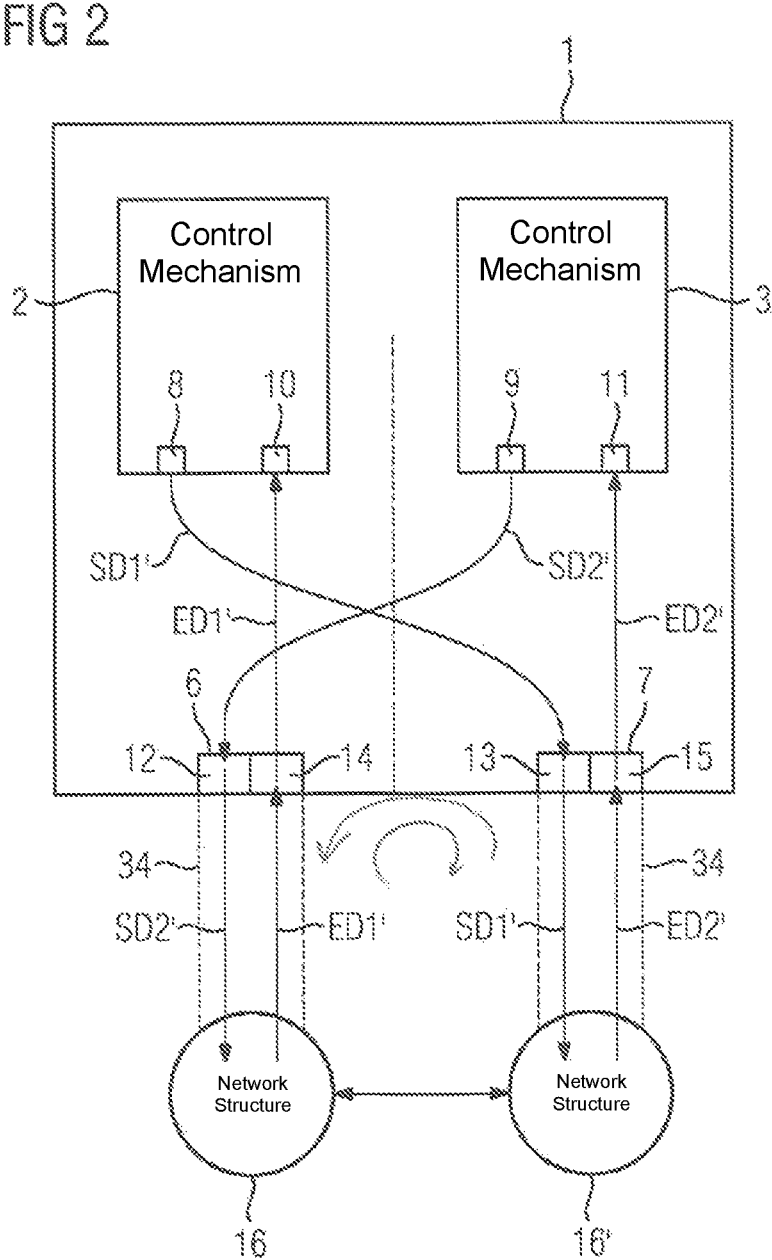

Alternatively to the crossover of the receive directions within the network mechanisms 100, 200, 300, it is also possible to have an overcrossing of the transmit paths, as indicated in FIG. 2. A correspondingly embodied topology of a network arrangement or an implementation with the alternative embodiment of a network mechanism also result in communication paths which are independent of each other, which are to a large extent physically separate, although they are implemented within a single physical ring-shaped network.

FIG. 2 is a schematic view of a further embodiment of a network mechanism 1. The network mechanism 1 is again equipped with two control mechanisms or CPUs 2, 3, which in each case comprise an internal transmit connector 8, 9 and an internal receive connector 10, 11. The two control mechanisms 2, 3 are established independently of each other and, for example, produced separately as chips. The network mechanism 1 has two physical ports 6, 7, which in each case have an external transmit connector 12, 13 and an external receive connector 14, 15. The physical ports 6, 7 enable the network mechanism 1 to be attached to the physical network infrastructure 16, 16'. For example, the physical ports enable coupling to glass fibers or network cables.

The network mechanism 1 is now set up such, for example internally cabled, that data ED1' received from the transmission medium 16 arrive at the external receive connector 14 and from there are routed to the internal receive connector 10 of the first control mechanism 2. Similarly, data ED2' received from the transmission medium 16' are routed by the external receive connector 15 of the second physical port 7 to the internal receive connector 11 of the second control mechanism 3.

Now, overcrossing of the transmitted data SD1', SD2', which are generated by the control mechanisms 2, 3 is provided. To this end, the internal transmit connector 8 of the first control mechanism 2 is coupled to the external transmit connector 13 of the second physical port 7. Hence, transmitted data SD1', which are generated by the first control mechanism 2, go via the second physical port 7 to the transmission medium 16'. Similarly, the internal transmit connector 9 of the second control mechanism 3 is coupled to the external transmit connector 12 of the first physical port 6. Hence, data SD2', which are generated by the second control mechanism 3, go via the first physical port 6 as transmitted data SD2' to or into the transmission medium.

With a plurality of network mechanisms 1, as shown in FIG. 1, the physical ports also enable a communication network to be established, for example, on an Ethernet basis or other switched network protocols, wherein in each case the first control mechanisms 2 and second control mechanisms 3 form ring structures that act independently of each other within a single ring-shaped physical network.

Figure 3:
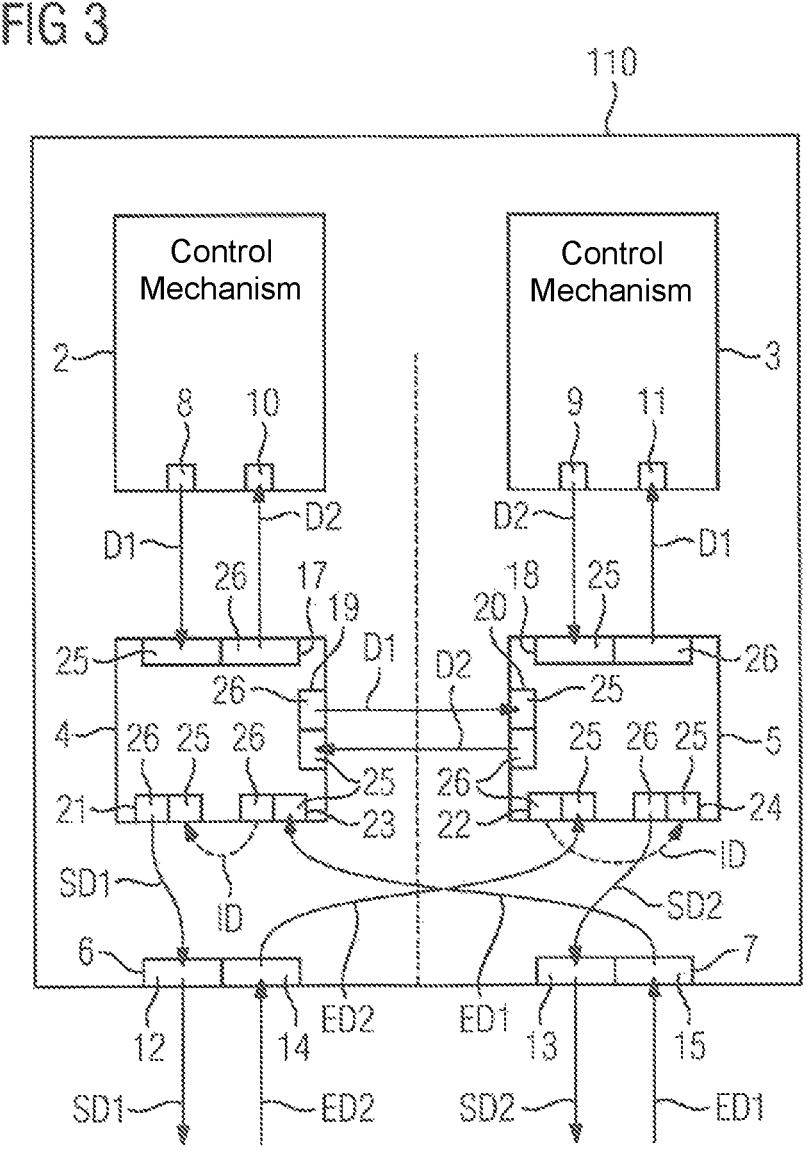

FIG. 3 shows a further embodiment of a network mechanism 110. Here, additional switch mechanisms 4, 5 are provided. A respective switch mechanism 4, 5 can comprise the respective physical ports 6, 7 as an integrated module. A switch mechanism 4, 5, for example, creates the linking between the physical ports 6, 7, which are coupled to the physical transmission medium, and the Media Access Control Layer (MAC-Layer). To this end, it is possible for (not shown here) bus systems or microprocessors and memories for routing tables to be provided internally.

Here, the respective switch mechanism 4, 5 has switch ports 17-24. The switch ports 17-24 in each case have an internal receive connector 25 and an internal transmit connector 26. In each case a switch port 17, 18 is connected to the internal transceiver connectors 8, 9, 10, 11 of the control mechanisms 2, 3.

In addition, two internal switch ports 19, 20 are coupled to each other, so that, in principle, a data exchange can take place between the resulting lanes or communication rings. The bandwidth for the data transmission between the two internal ports 19, 18 between the switch mechanisms 4, 5 is in particular significantly bandwidth-reduced and hence, in the event of a babbling idiot, there is only little interference to the overall data transmission. The switch ports 19, 20 or data transmission between the control mechanisms 2, 3 via the switches 4, 5 is used, for example, for a consistency check on complementary generated data D1 and D2 by the control mechanisms 2, 3.

The switch mechanism 4 is now set up, for example by suitable programming, such that data D1, which go from the first control mechanism 2 via the internal transmit connector 8 to the switch ports 17 or the receive connector 25, are coupled via the switch port 21, which is connected to the first physical port 6, into a communication medium. Insofar, this results in a data path from D1 and SD1 via the connectors 8, of the switch port 17, 26 of the switch port 21 and 12. Similarly, data D2, which are generated by the second control mechanism 3, are routed by the correspondingly set-up switch mechanism 5 via the connectors 25 of the switch port 18, the connector 26 of the switch port 24, to the physical port 7 or the external transmit connector 13 there. Hence, the data D2 enter the communication medium as transmitted data SD2.

Received data are routed or conducted similarly to the embodiment in FIG. 1 crosswise to the control mechanisms 2, 3. The data ED2 received at the first physical port 6 are, for example, supplied by direct wiring to the switch port 22 of the second switch mechanism 5. Similarly, a crossover rerouting of the data ED1 received at the second physical port 7 to the switch port 23 of the first switch mechanism 4 takes place. For example, the external receive connector 15 is directly coupled to the receive connector 25 of the switch port 23. The received data ED1 are rerouted by the switch mechanism 4, which is correspondingly set up, via the switch port 17 to the first control mechanism 2. As shown above, crossover receive data paths ED1 and ED2 enable the embodiment of a double ring structure of corresponding network mechanisms 110.

In some implementations of switch mechanisms, for example as an integrated circuit, it is expected as standard that all connectors of a respective switch port are occupied and receive or send data. Since, due to the crossover data communication, in particular the two switch ports 21 and 23 of the first switch mechanism 4 and the switch ports 22 and 24 of the second switch mechanism 5 sometimes do not receive any received data (port 21: receive connector 25 and port 24: receive connector 25), optionally, an internal linking of the unused transmit connectors 26 of the port 23 and of the port 22 can be implemented. This is in indicated in FIG. 3 by the dashed arrows ID. Insofar, internally, data ID that is not necessarily meaningful can be transmitted between ports of a respective switch mechanism. This can take place by internal or external cabling or wiring to pins of the respective switch mechanism 4, 5.

In some standard implementations, a switch mechanism or a switch chip already comprises one or more physical ports. In order to implement the crossover data transformation between left (lane A) and right (lane B) or the part consisting of the first control mechanism 2, first switch mechanism 4 and physical port 6 on the one hand and the part consisting of second control mechanism 3, second switch mechanism 5 and physical port 7 on the other, the respective switch port or the switch ports 21, 23, 22, 24 can be expanded by hardware, for example via track conductors on a printed circuit board. These track conductors then complete the crossover or linking of the input data ED1, ED2.

Figure 10:
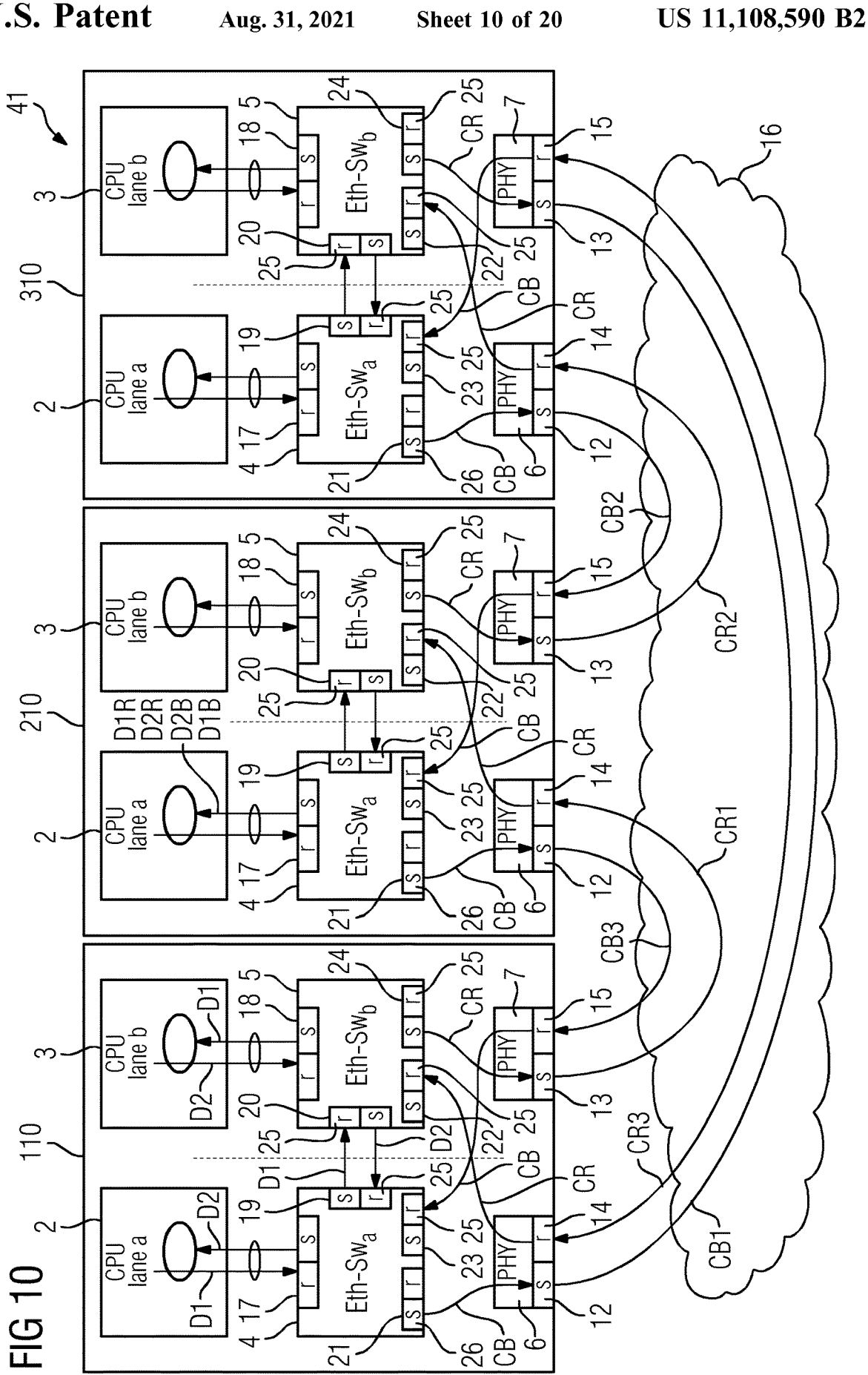

FIG. 10 shows a network arrangement 41 comprising a ring structure of three network mechanisms 110, 210, 310, wherein the network mechanisms 110, 210, 310 are constructed as in the embodiment shown in FIG. 3. In particular the coupling of the transmit and receive connectors 12, 13, 14, 15 of the physical ports 6, 7 of the network mechanisms 110, 210, 310 result in a ring structure, as already shown in FIG. 9. Insofar, a first communication path, which is embodied in a ring shape and can also be designated lane A is obtained from the segments CB1, CB2, CB3. Reference is also made to the "blue" communication path in connection with the embodiments shown here. A second communication path with the opposite communication direction to the first communication path of lane A results from the segments CR1, CR2 and CR3. The "red" communication path is also designated lane B.

The crossover linking of the data within the network mechanisms 110, 210, 310, as explained in FIG. 3, results in physically independent ring-shaped networks within a single ring-shaped physical network. A communication or a data comparison between the two lanes A or B can take place by the switch ports 19, 20, which are coupled internally to each other, in each of the network mechanisms 110, 210, 310. The internal crossover interconnection of the two ring-shaped network structures are indicated with CB for the blue lane A and with CR for the red lane B. If an error occurs in one of the elements, for example a switch or a CPU, causing said element to send meaningless data in the manner of a babbling idiot in a network segment, in each case this only affects one lane, but not the entire network, since the physical components participating in data transport via lane A and lane B, are physically independent of each other, although lane A and lane B are the two directions in a single communication ring. Here, the internal linking between lanes by the switch ports 19, 20 can be provided with broadband reduction.

In principle, the network mechanisms 110, 210, 310 can be set up such that only data which are transmitted directly by the CPU 2 or 3 of the respective switch mechanism 4, 5 are transmitted directly to the data comparison or monitoring or supervision within the respective CPU 2, 3 For example, the CPU 2 of the first network mechanism 110 can generate data D1 and the second CPU 3 data D2. If there is no interference, the data D1 and D2 are connected to each other by a coding and contain the same data, for example sensor or control data. The consistency of the two data versions D1 and D2 is for example compared in a monitoring process, so that in the event of incompatibility of D1 and D2, the CPUs 2, 3 for example can be deactivated since an error could be present in the network mechanism or one of the CPUs.

A direct connection of the physical ports 6, 7 to the other switch mechanism 4, 5 in each case also results in a higher data rate or transmission speed, since, for example, at the receive port 14 of the first physical port 6 of the first network mechanism 110, the received data run directly to the receive connector of the switch port 22 of the other switch mechanism 5 and do not have to processed in a switch or routing method in a switch mechanism.

Figure 11:
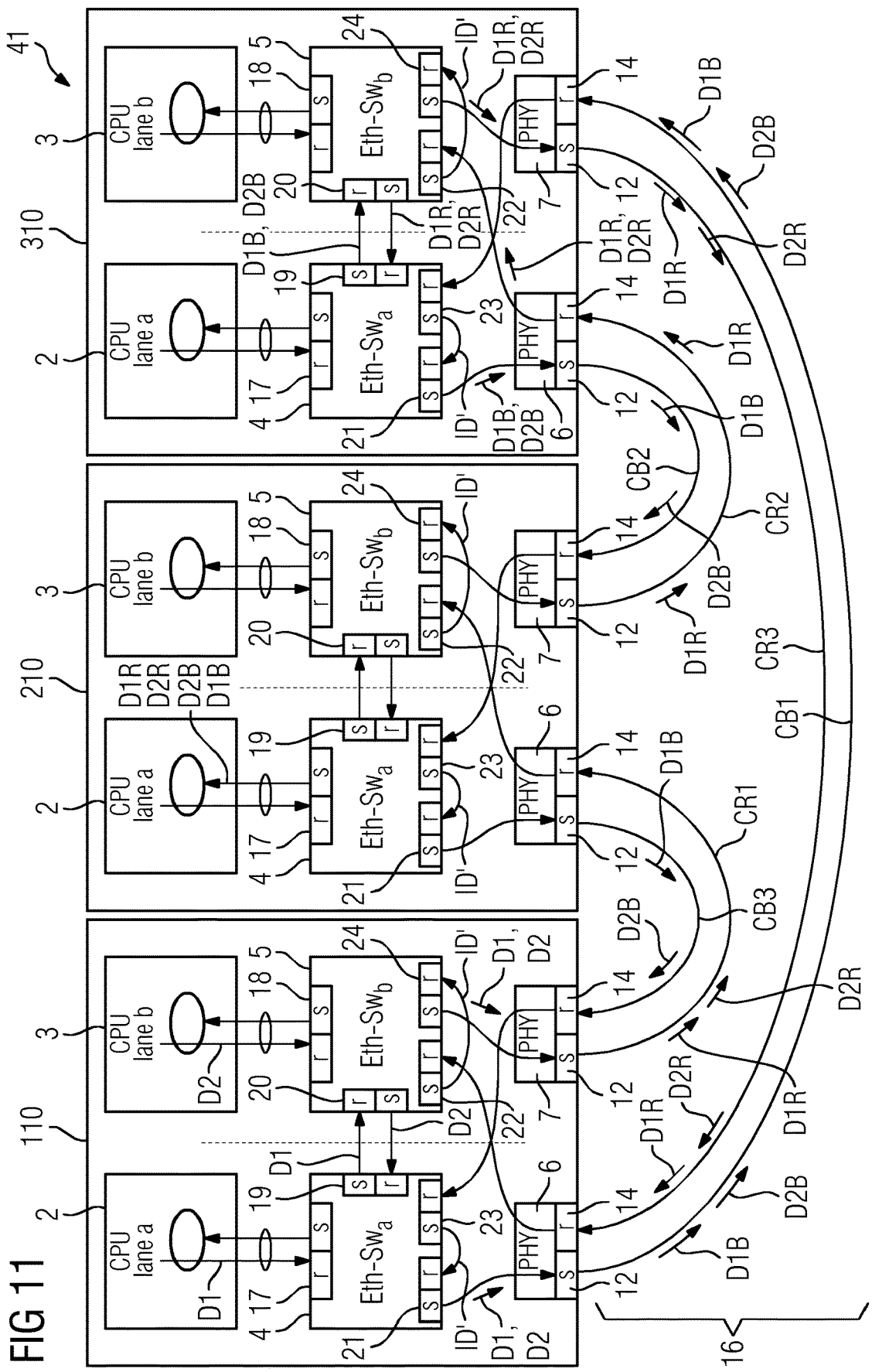

FIG. 11 shows a modification of a network arrangement 41. As already explained with reference to FIG. 3, it is conceivable that in particular standard switch components data is expected at each transmit or receive connector.

In addition to the crossover internal received data transmission, in the depiction in FIG. 10, unused transmit and receive connectors of the switch ports are linked to each other. Transmit connectors are designated S, receive connectors R. For example, the transmit connector of the port 23 is coupled to the receive connector of the port 21. This is indicated by the arrow ID'. In addition, the transmit connector of the port 22 is coupled to the receive connector of the port 24. This is also indicated by the arrow ID'.

In particular in the case of the embodiments 41 as shown in FIGS. 10 and 11, the bandwidth can be limited by the switch ports 19, 20 that are connected internally to each other and hence, in the case of a babbling idiot in the network, regular data traffic can take place as before via lane A and lane B. For example, the bandwidth can be limited on the receive side, that is in each case at the receive connector and the mechanisms present within the respective switch mechanism 4, 5. In addition, the data traffic can be prioritized so that the internal data exchanges D1, D2 (see network mechanisms 210, 310) are prioritized via the ring traffic.

In the depictions in the FIGS. 10 and 11, D1B designates data D1 that were generated by the CPU 2 and pass through lane A, that is the "blue" lane. Data that were generated by the second control mechanism 3 via lane B are designated D2R. Similarly data that originate from the second control mechanism 3 and run through the "blue" lane A are designated D2B. It can be recognized in the depiction in FIG. 11 that, as in FIG. 10 or 9, the ring structures implement data traffic independently of each other.

During the operation of the communication network, as shown in FIG. 11, the network mechanisms 210 and 310 with their control mechanisms 2, 3 perform monitoring and a consistency check on the two types of data D1 and D2 encoded with each other. Here, for example, independently of each other, the CPUs receive data D1 and D2 via the lane A and with the aid of the switch ports 19, 20, which are internally linked to each other, also data D1 and D2 from lane B. If there are no errors in the network, the contents of all data are compatible with each other.

Figure 4:
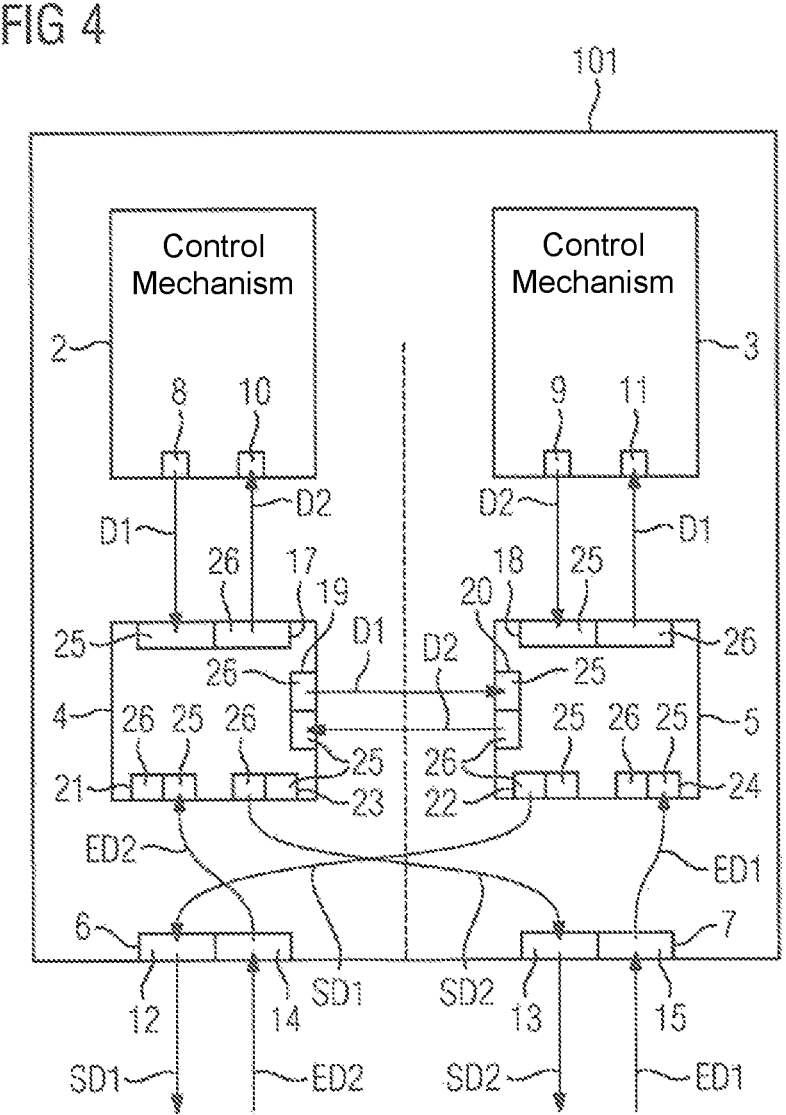

Instead of the crossover coupling of the received data within the respective network mechanism 110, 210, 310, it is also possible, as indicated in FIG. 2, for crossover coupling of the transmitted data to take place in a network mechanism. Therefore, FIG. 4 shows a modified embodiment of a network mechanism 110, with which, similarly to the case with the embodiment in FIG. 2, the transmit paths between the lanes cross over.

The network mechanism 101 comprises two control mechanisms or CPUs 2, 3. The network mechanism 101 has two physical ports 6, 7 with in each case an external transmit connector 12, 13 and a receive connector 14, 15. In each case a switch mechanism 4 is assigned to the first control mechanism 2 and a switch mechanism 5 to the second control mechanism 3. The switch mechanisms 4, 5 have switch ports 17-24. Of these, one switch port 17 of the first switch mechanism 4 is coupled to the internal transmit and receive connectors 8, 10 of the first control mechanism 2 and the switch port 18 of the second switch mechanism 5 is coupled to the transmit and receive connectors 9, 11 of the second control mechanism 3. Two switch ports 19, 20 are coupled to each other in order to enable internal and inter-lane data exchange. In addition, the first switch mechanism 4 comprises a switch port 21, which is used for receiving data ED2 received from the network. A second switch port 23 is used to send transmitted data SD2 into one of the network rings.

Similarly, the second switch mechanism 5 has a switch port 22, which is used to send data SD1, and a switch port 24, which is used for receiving data ED1 from the network. The data ED2 received at the external receive connector 14 of the first physical port 6 are, for example, supplied by direct wiring to the receive connector 25 of the switch port 21. The data ED1 received by the network are routed by the external receive connector 15 of the physical port 7 to the receive connector 25 of the switch port 24.

In order to achieve physical decoupling of two ring structures, as indicated in FIG. 2, transmitted data originating from the first control mechanism 2 are transmitted via the second physical port 7 and transmitted data originating from the second control mechanism 3, via the first physical port 6. Therefore, the transmit connector 26 of the switch port 23 of the first switch mechanism 4 is connected to the external transmit connector 13 of the second physical port 7. The transmit connector 26 of the switch port 22 is connected to the external transmit connector 12 of the first physical port 6. Insofar, a topology results with which, by interconnecting a plurality of network mechanisms 110 of this kind, two ring-shaped communication paths functioning independently of each other can form within a single ring-shaped physical network.

Figure 5:
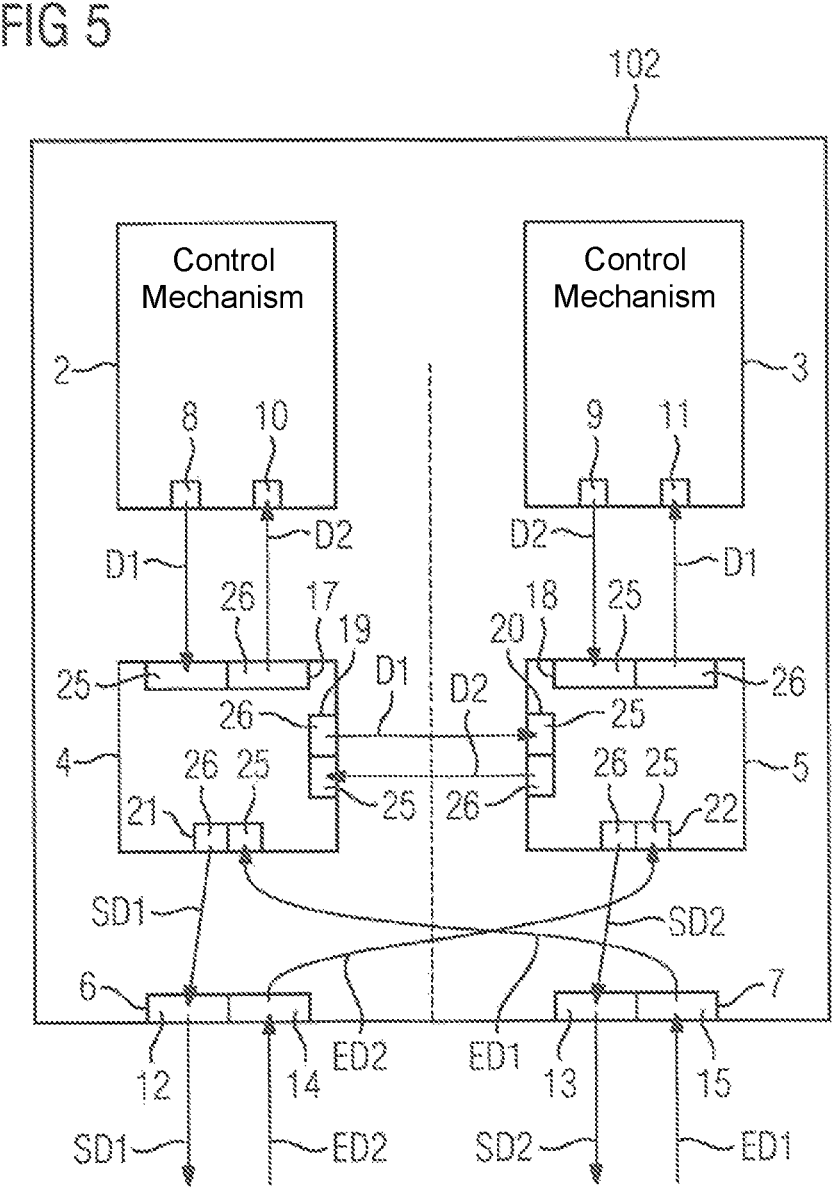

FIG. 5 shows another embodiment of a network mechanism 102. The network mechanism 102 substantially comprises the elements as shown with reference to the embodiment in FIG. 3. However, the switch mechanisms 4, 5 are embodied such that data can be sent simultaneously by a switch port that is receiving data. Preferably, in particular the received data are output again at the same switch port. This enables the number of switch ports used in a switch mechanism to be reduced.

Insofar, the first switch mechanism 4 only has three switch ports 17, 19, 21 and the second switch mechanism 5 also has three switch ports 18, 20, 22. Here, the switch ports 19 and 22 for the interlane data exchange are coupled to each other. The external transmit connector 12 of the first physical port 6 is coupled to a transmit connector 26 of the switch port 21 of the first switch mechanism 4. The transmit connector 26 of the switch port 22 of the second switch mechanism 5 is coupled to the external transmit connector 13 of the second physical port 7.

A linking to the receive connector 25 of the switch port 21 of the first switch mechanism 4 is now provided from the external receive connector 15 of the second physical port 7. Similarly, the external receive connector 14 of the first physical port 6 is connected to the receive connector 25 of the switch port 22. Hence, in principle, cross-coupling of the received data ED1, ED2 is implemented. In the case of conventional switch mechanisms, it is generally not provided that data that was received via the receive connector 25 of a port is sent again via the transmit connector 26 of the same port. The switch ports 21, 22 are insofar implemented as combination ports of the switch mechanisms 4, 5. It could be said that the switch mechanisms 4, 5 are set up to bounce data. I.e., a port comprising a receive connector and a transmit connector sends the data received at the receive connector via the transmit connector.

Figure 12:
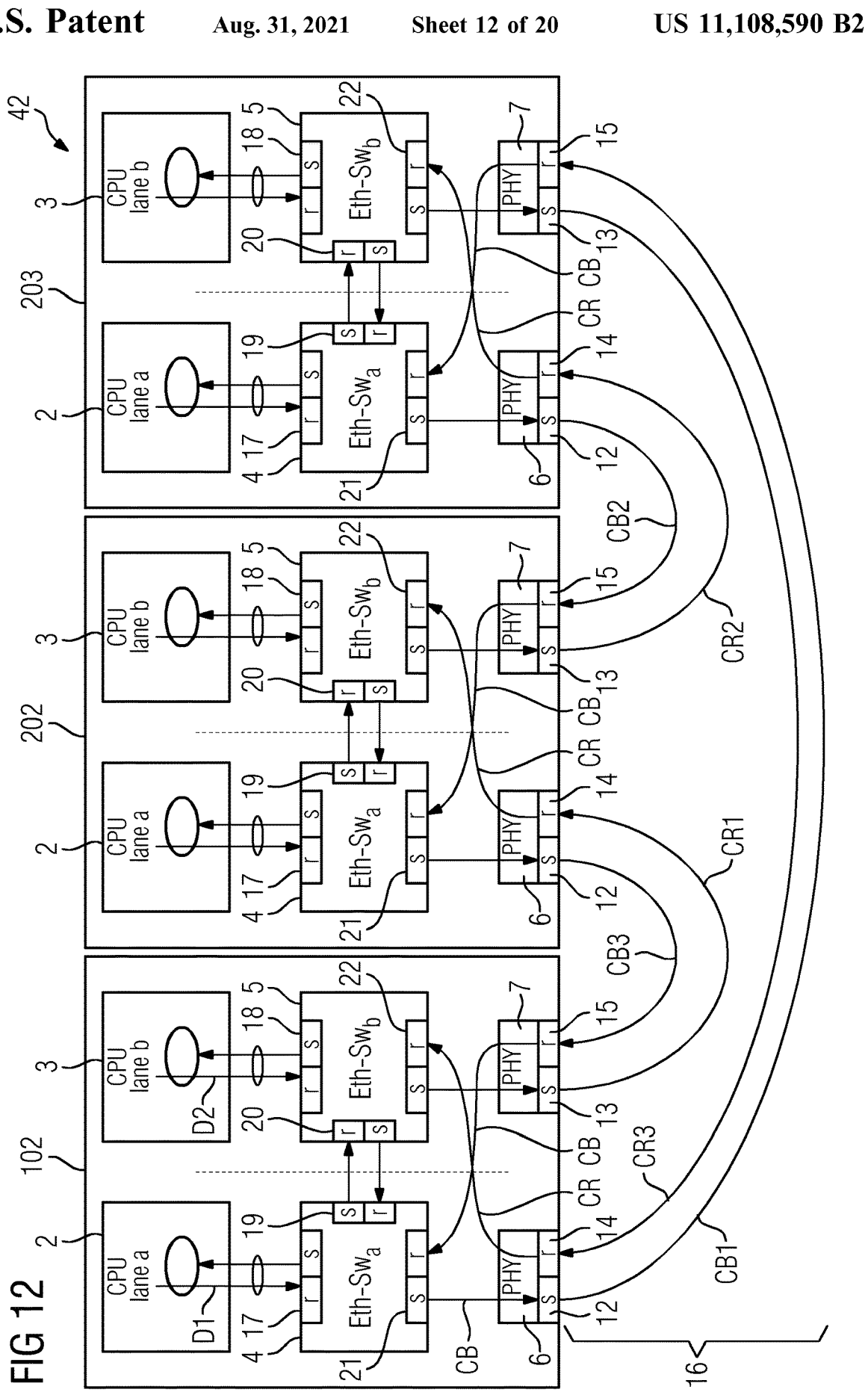

FIG. 12 shows a schematic representation of a network or a network arrangement 42 constructed from network mechanisms as shown in FIG. 5. There are, for example, three network mechanisms 102, 202, 203 embodied as shown and explained in FIG. 5.

As already explained with reference to FIGS. 9-11, the linking of the transmit and receive connectors S, R results in two ring-shaped communication networks within a single ring-shaped physical network. This results in lane A, CB1, CB2, CB3, CB, and lane B, CR1, CR2, CR3, CR. The internal linking of the ports and connectors in the network mechanisms 102, 202, 203 is achieved as shown in FIG. 5. This has the advantage that only a few switch ports have to be used and ring-shaped networks that are physically independent of each other are formed. The internal communication between switch ports 19, 20 can in particular be bandwidth-limited in order to reduce effects of babbling idiots which transmit meaningless data at a high frequency in the network.

Figure 6:
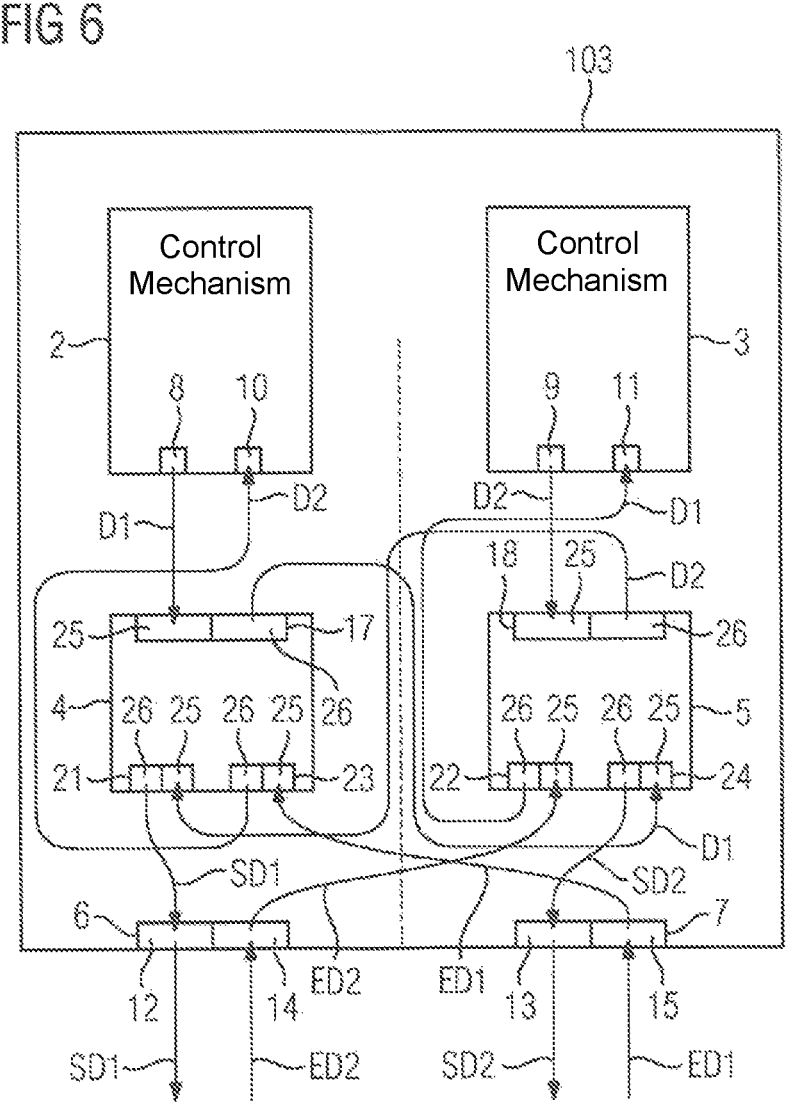
Figure 13:
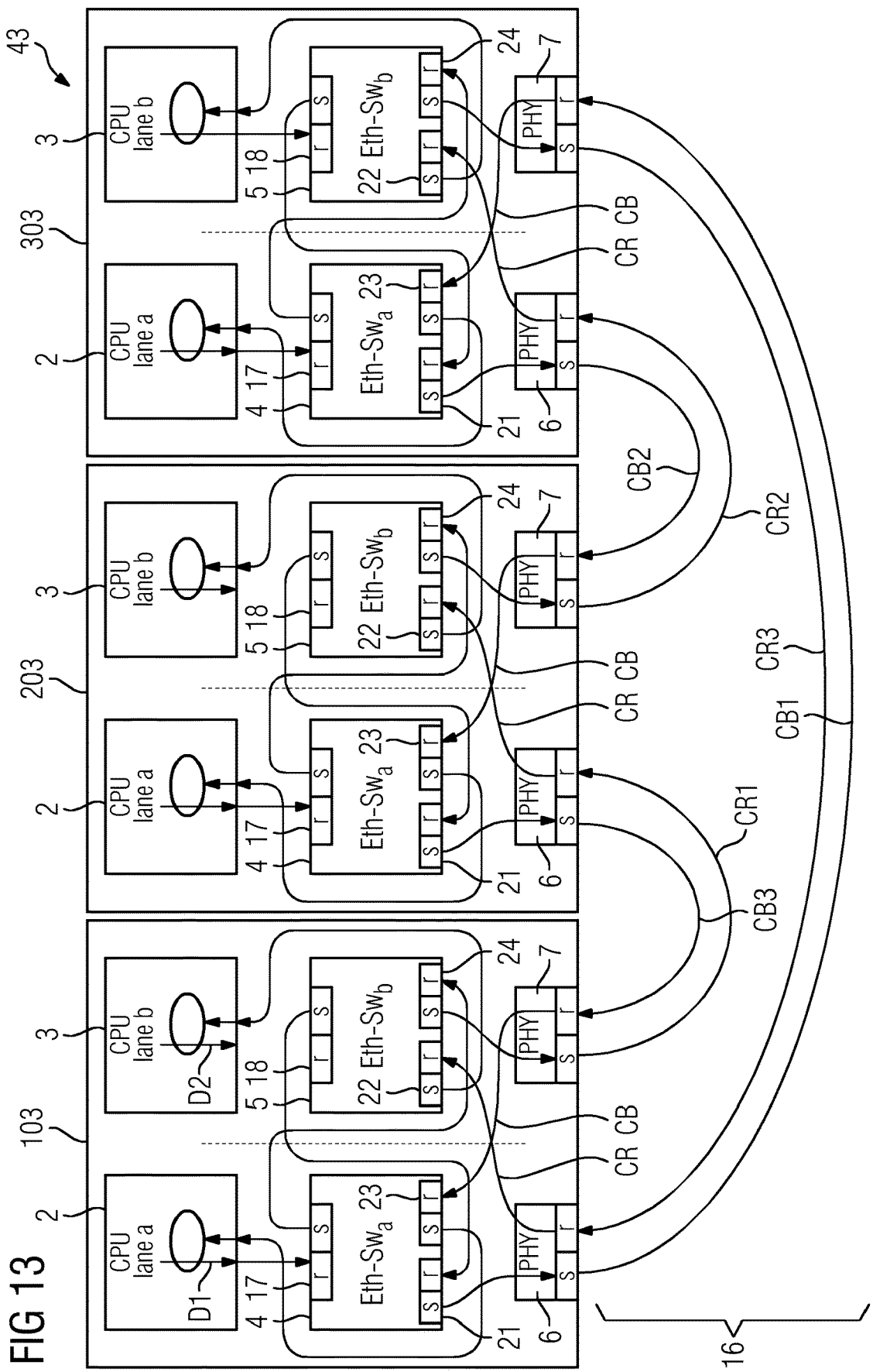

FIG. 6 shows a further embodiment of a network mechanism 103. FIG. 13 shows a network arrangement 43 constructed of corresponding network mechanisms 103, 203, 303.

FIG. 6 shows that the network mechanism 103 comprises two control mechanisms 2, 3 in each case comprising internal transmit connectors 8, 9 and internal receive connectors 10, 11. A switch mechanism 4, 5 is assigned to each control mechanism 2, 3. The network mechanism 103 further comprises a first physical port 6, to which the first control mechanism 2 is assigned and a second physical port 7 to which the second control mechanism 3 is assigned. Each switch mechanism 4, 5 has three switch ports 17, 18, 21, 22, 23, 24 in each case with a transmit connector and a receive connector 26. In FIG. 13, the transmit connectors are designated S and the receive connectors R.

To couple-in transmitted data generated by the first control mechanism 2, the receive connector 25 of the port 17 of the first switch mechanism is coupled to the transmit connector 8 the control mechanism 2. In addition, the transmit connector 26 of the switch port 21 of the first switch mechanism 4 is coupled to the external transmit connector 12 of the first physical port 6. In addition, data ED1 received by a communication network 16 are coupled by the receive connector 15 of the second physical port 7 to the receive port 25 of the switch port 23 of the first switch mechanism 4. Insofar, with respect to FIG. 13, a lane A results for data using the communication path CB1, CB2, CB3, CB.

Similarly, the external receive connector 14 of the first physical port 6 is connected to the input connector 25 of the switch port 22 the second switch mechanism 5. The transmit connector 26 of the switch port 24 of the second switch mechanism 5 is connected to the external transmit connector 13 of the physical port 7. Hence, a red lane B results (see FIG. 13) with the segments CR1, CR2, CR3, CR.

In the embodiment in FIG. 6, the control mechanisms 2, 3 are not directly communicatively connected to each other. Instead, the switch mechanisms 4, 5 are connected to each other and set up or programmed such that data D1 from the first control mechanism 2 are also able to go to the second control mechanism 3 or data D2 from the second control mechanism 3 to the first control mechanism 2. This enables monitoring with data comparison with respect to the plausibility or correct logical linking of the data D1 and D2.

The two switch mechanisms 4, 5 are now set up such that data arriving at a port are (can be) resent by the same port. For example, the data D1, which can be picked at the internal transmit connector 8 of the first control mechanism 2, are received at the receive connector 25 of the port 17 and output again at the same port via the transmit connector 26. The transmit connector 26 of the port 17 is connected to the receive connector 25 of the port 24. The switch mechanism 5 routes or switches the corresponding data D1 such that they are routed by the transmit connector 26 of the port 22 to the connected internal receive connector 11 of the second control mechanism 3.

Similarly, it is possible to transmit data D2, which are present at the internal transmit connector 9 of the second control mechanism 3, via the receive connector 25 of the port 18, the transmit connector 26 of the port 18, the receive connector 25 of the port 21 and the transmit connector 26 of the port 23 to the receive connector 10 the first control mechanism 2. Internally, the first or second switch mechanism 4, 5 can effect bandwidth limitation for these two data paths for the connection of the control mechanisms 2, 3 to each other.

FIG. 13 shows three similar network mechanisms 103, 203, 303 in a correspondingly embodied network arrangement 43.

Figure 14:
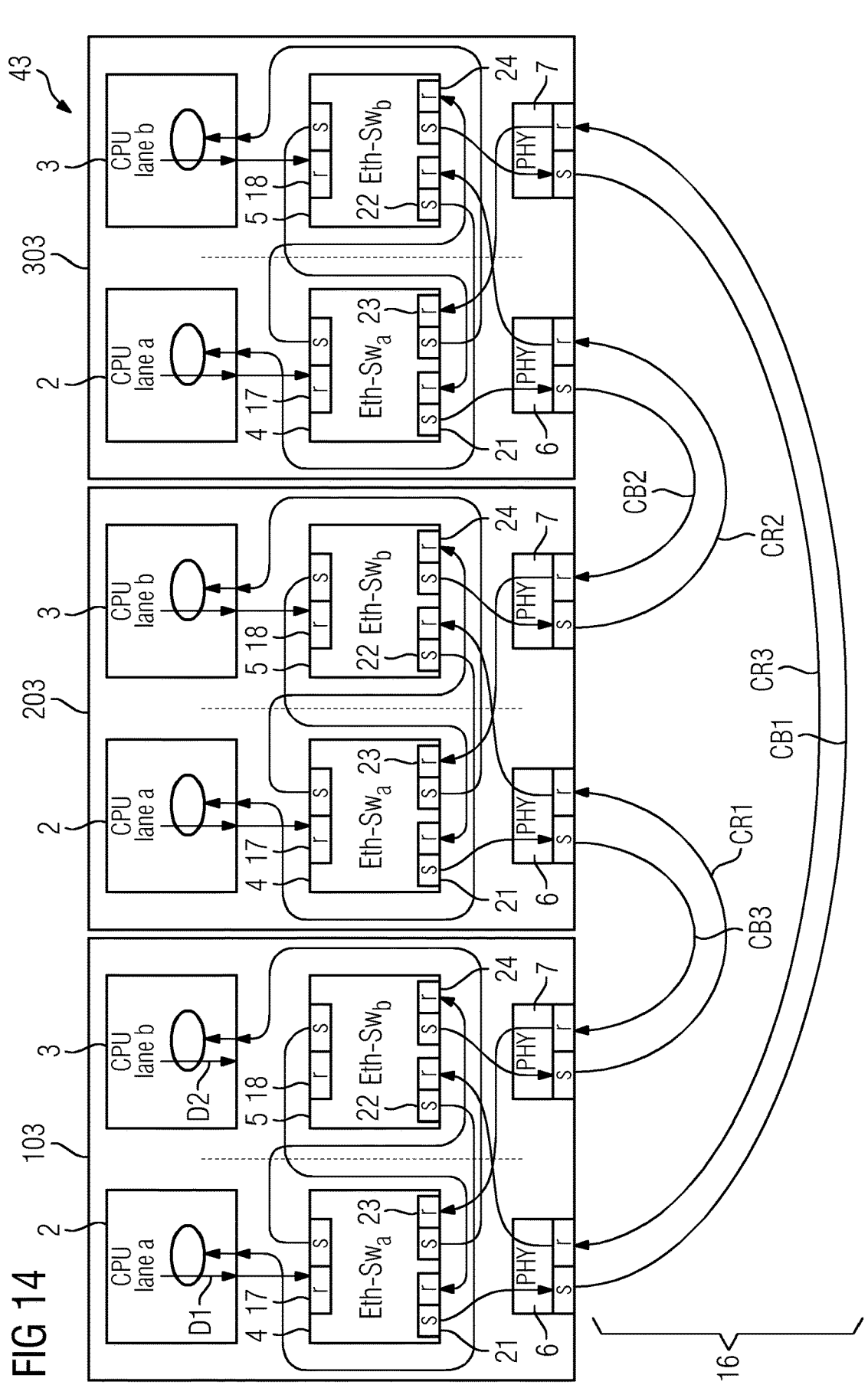
Figure 15:
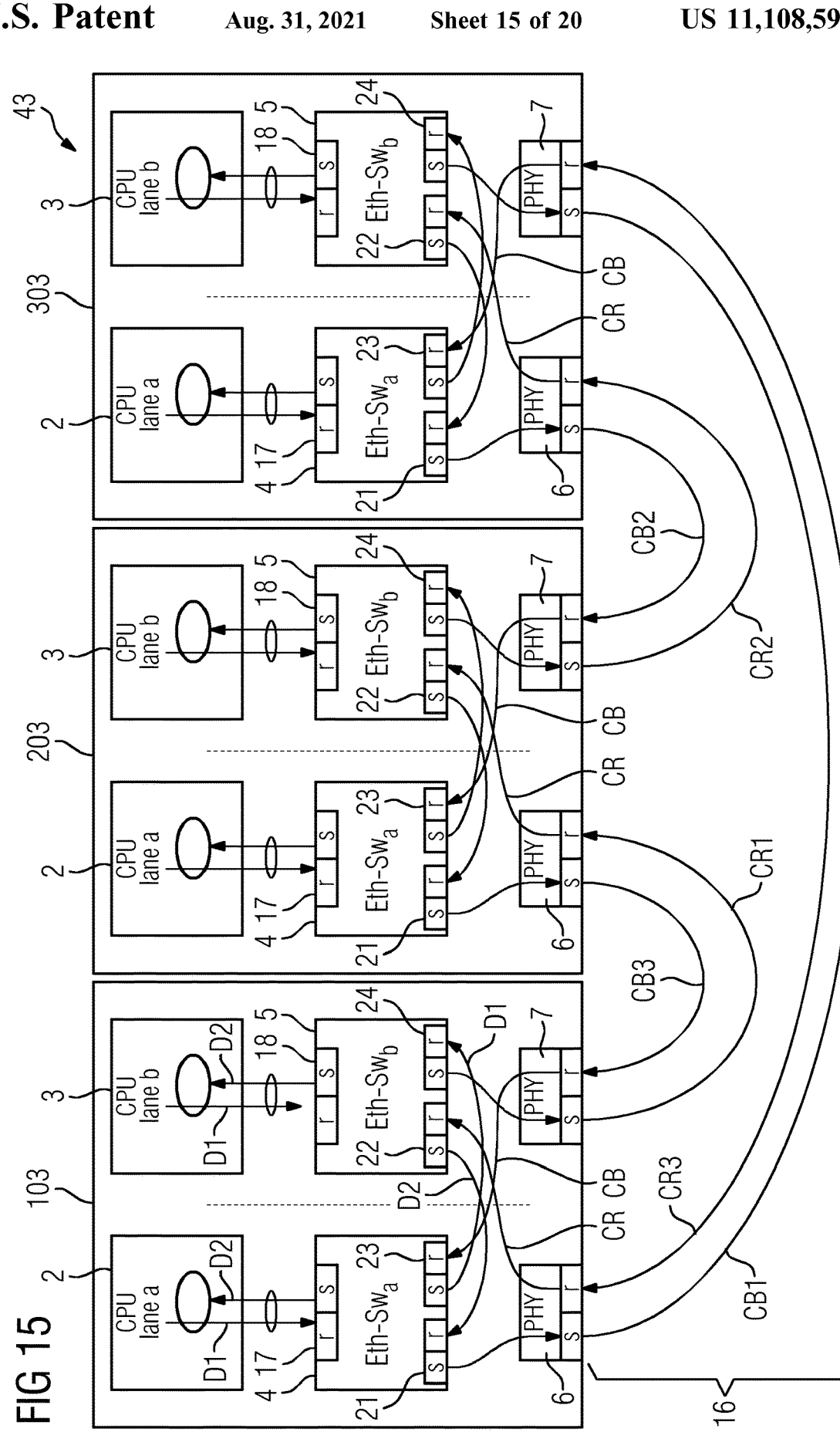

FIGS. 14 and 15 show modified implementations of a network arrangement 43 with the network mechanisms as shown in FIG. 6. FIG. 14 shows with respect to the crossover coupling of receive paths between the second physical port 7 and the first CPU 2 with the aid of the first switch mechanism 4 on the one hand or the coupling of the first physical port 6 to the second CPU 3 with the aid of the second switch mechanism 5, on the other, the same configuration as was described with respect to FIG. 13. However, for internal data exchange or comparison between the CPUs 2, 3 in the network mechanisms 103, 203, 303 of the transmit connector of the switch port 17, the first switch mechanism is coupled to the receive connector of the switch port 24 of the second switch mechanism. The transmit connector of the switch port 18 of the second switch mechanism 5 is coupled to the receive connector of the port 21 of the first switch mechanism 4. Insofar, the switch ports 17 and 24 and 18 and 21, the coupling of the transmit port of the switches 23 to the CPU 3 and the coupling of the transmit port of the switch port 22 to the CPU 2 permit the use of all transmit and receive connectors of the respective switch mechanism 4, 5. Functionally, this results in the same advantageous data transmission as for the configuration, which is shown in FIG. 13.

FIG. 15 shows a further modification of the network arrangement 43, with which communication between the CPUs 2, 3 takes place via a coupling of the transmit connector of the switch port 22 of the second switch mechanism 5 to a receive port of the switch port 21 of the first switch mechanism 4. Hence, the data D2 is able to go to the CPU 2. In addition, the transmit connector of the switch port 23 is coupled to the receive connector of the switch port 24 so that the data D1 that are generated by the CPU 2 can also be evaluated by the CPU 3 with the aid of the switch port 18. The links bridging the respective lane A or B within the network mechanism 103, 203, 303 are preferably bandwidth-limited so that a babbling idiot only causes manageable interference.

Figure 7:
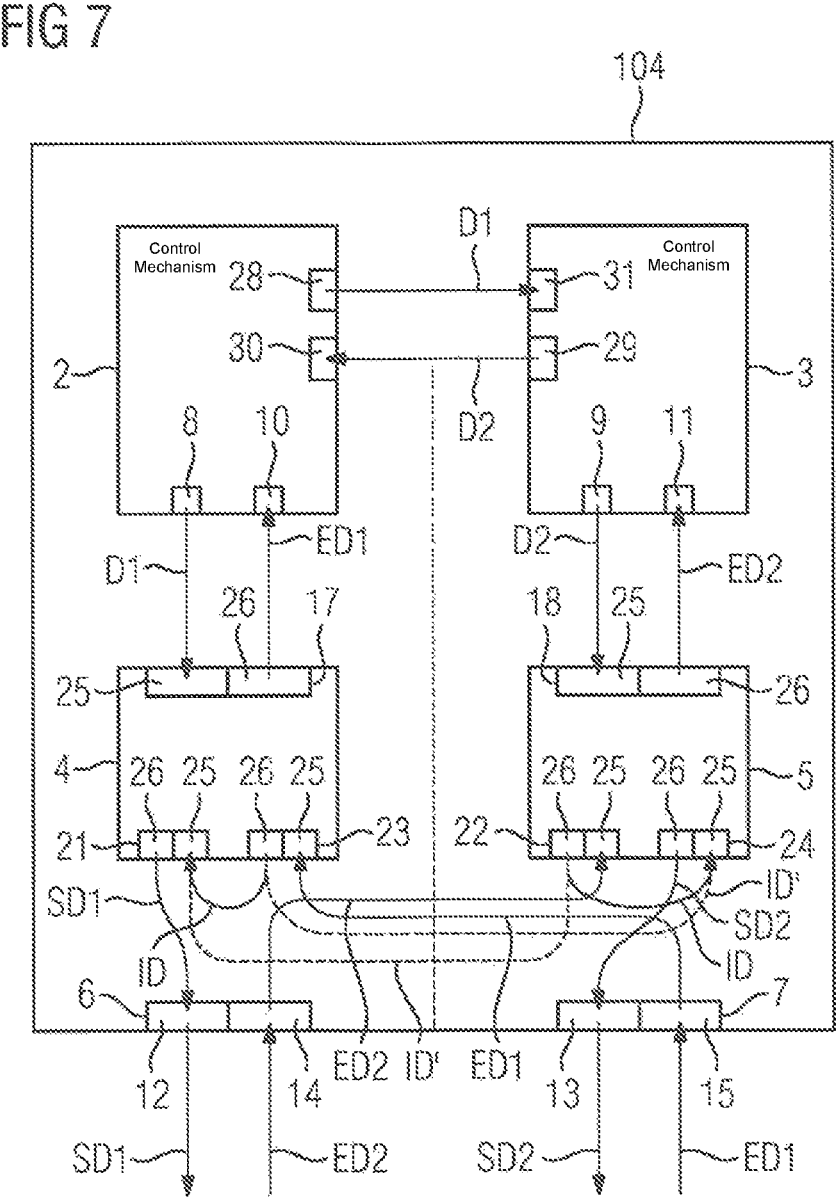

FIG. 7 is another schematic view of a modified embodiment of a network mechanism 104. The network mechanism 104 comprises two control mechanisms 2, 3 and in each case a switch mechanism 4, 5 assigned to the control mechanism 2, 3. The network mechanism 104 has a first physical port 6 with a transmit connector 12 and a receive connector 14 and a second physical port 7 with a transmit connector 13 and a receive connector 15. The switch mechanisms 4, 5 have in each case three switch ports 17, 21, 23 and 18, 22, 24. In addition, the control mechanisms 2, 3 each have a pair of internal transmit and receive connectors 28, 29, 30, 31. The control mechanisms 2, 3 are hence directly coupled to each other and can exchange data D1, D2. Since, in operation, the data D1 generated by the first control mechanism 2 should be logically linked to the data D2 generated by the second control mechanism 3, insofar a direct consistency check can be performed and hence the function of the respective other or inherent control mechanism 2, 3.

Figure 16:
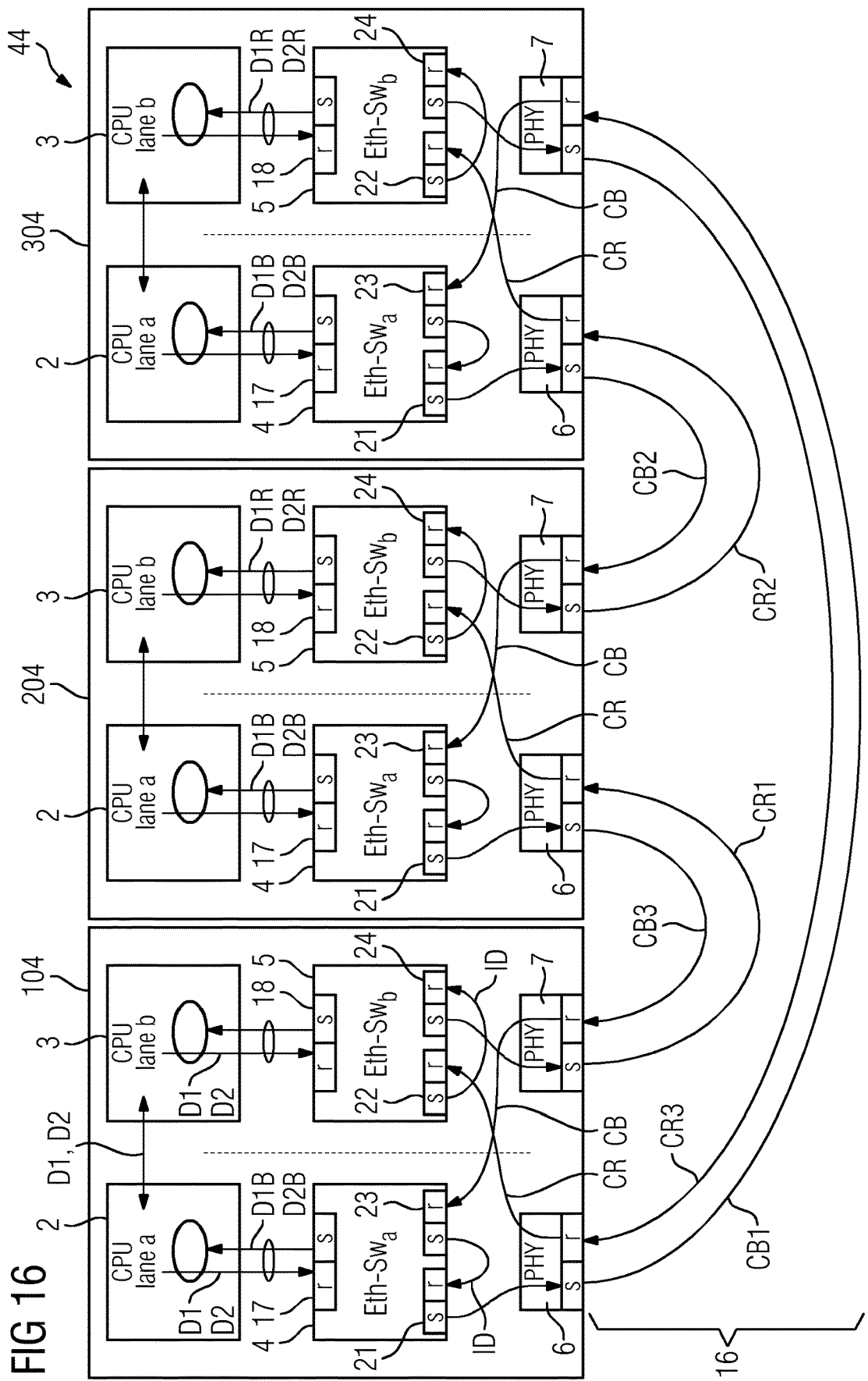

The switch ports 21, 22, 23 and 24 are connected to the external transmit and receive connectors 12, 14, 13, 15 of the physical ports 6, 7, as shown in FIG. 6. This also shows two possibilities for coupling transmit and receive connectors of the switch mechanisms 4, 5 that are not necessarily occupied to each other in order to simulate links. An alternative is provided in case ID, which couples the transmit connector 26 of the switch port 23 to the receive port 25 of the switch port 21. Similarly, in the second switch mechanism 5, the transmit connector 26 of the switch port 22 can be coupled to the receive connector 25 of the switch port 24. A corresponding implementation is shown as a network arrangement with two ring structures in FIG. 16 as a network arrangement 44. The direct coupling of the two control mechanisms 2, 3 to each other by an internal link results in complete decoupling of the ring directions or lane A and lane B. Received data ED1 or ED2 exclusively pass through mechanisms assigned to either lane A or lane B.

Figure 17:
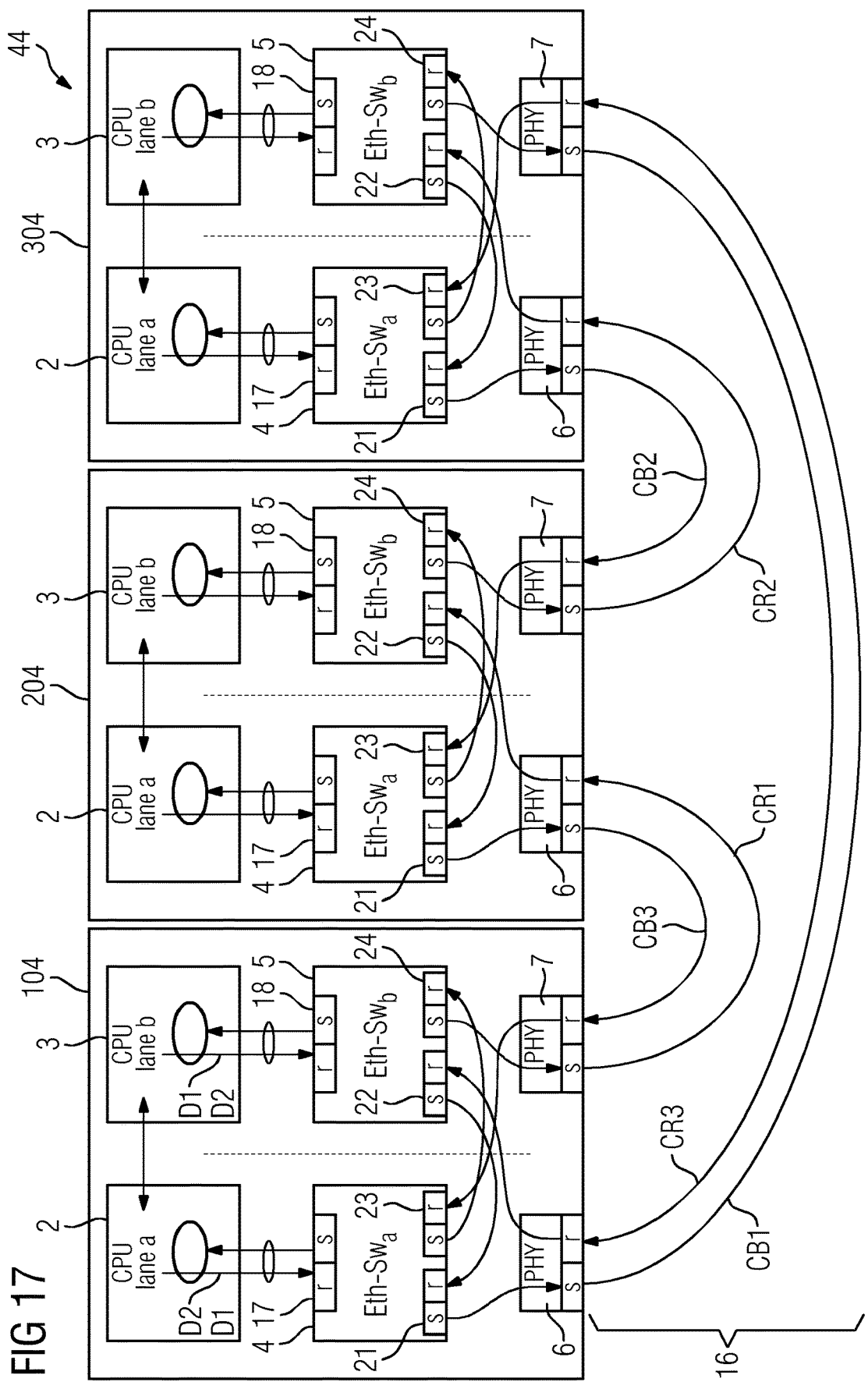

FIG. 17 shows a similarly embodied configuration of the network arrangement 44. However, the switch ports that are in principle not needed to form the ring or transmit and/or receive connectors of the switch mechanisms 4, 5 are connected to each other differently. In FIG. 7, the configuration in FIG. 17 corresponds to the dotted arrows ID'.

Figure 18:
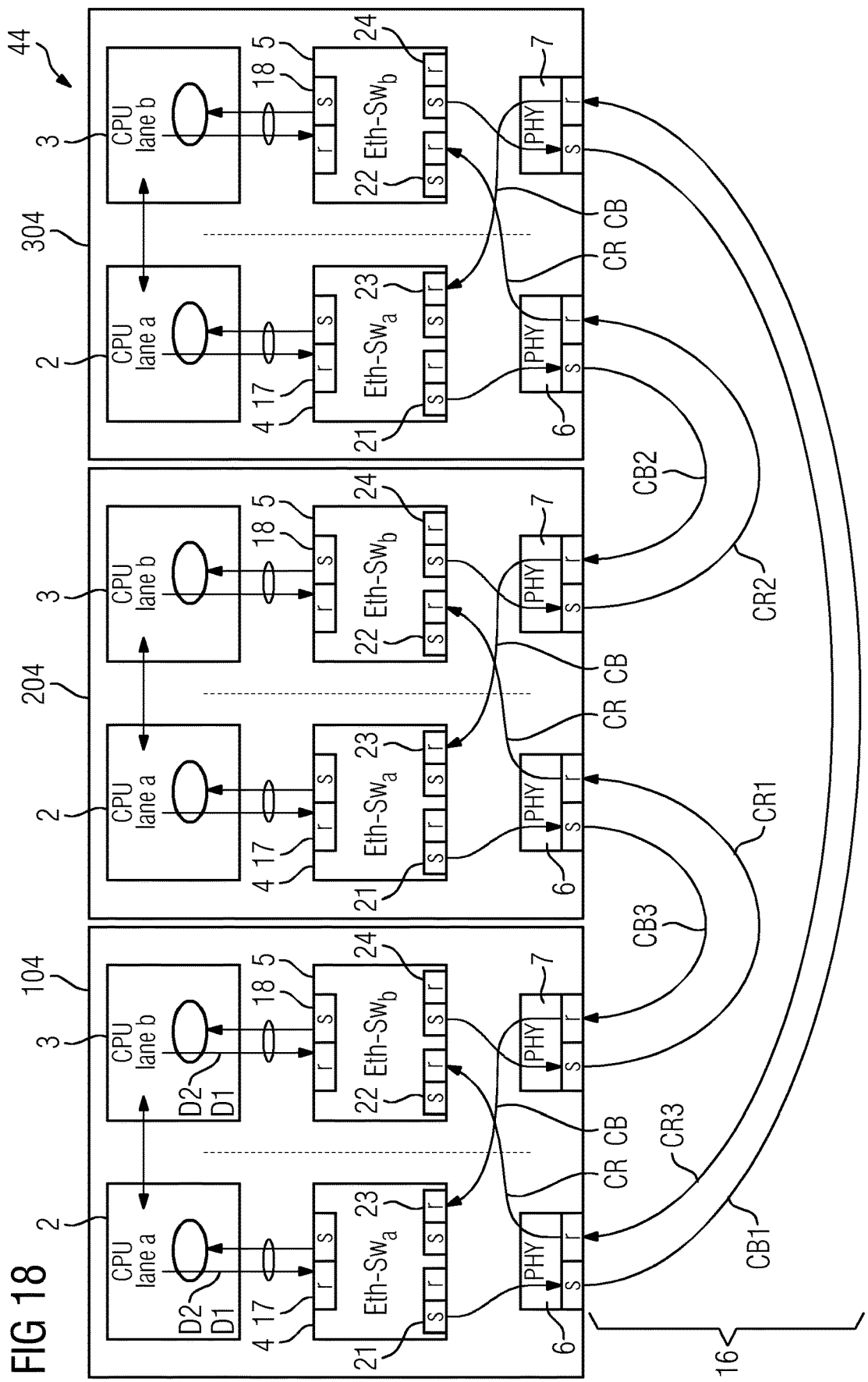

Finally, FIG. 18 shows another a modified configuration of a network arrangement 44. Here, the internal links ID, as indicated in FIG. 7 are dispensed with. The embodiment of the network arrangement 44 in FIG. 8 requires correspondingly implemented switch mechanisms to be able, for example as standard ICs, to manage ports that are only half-switched and still ensure reliable routing or switching of the data.

Figure 8:
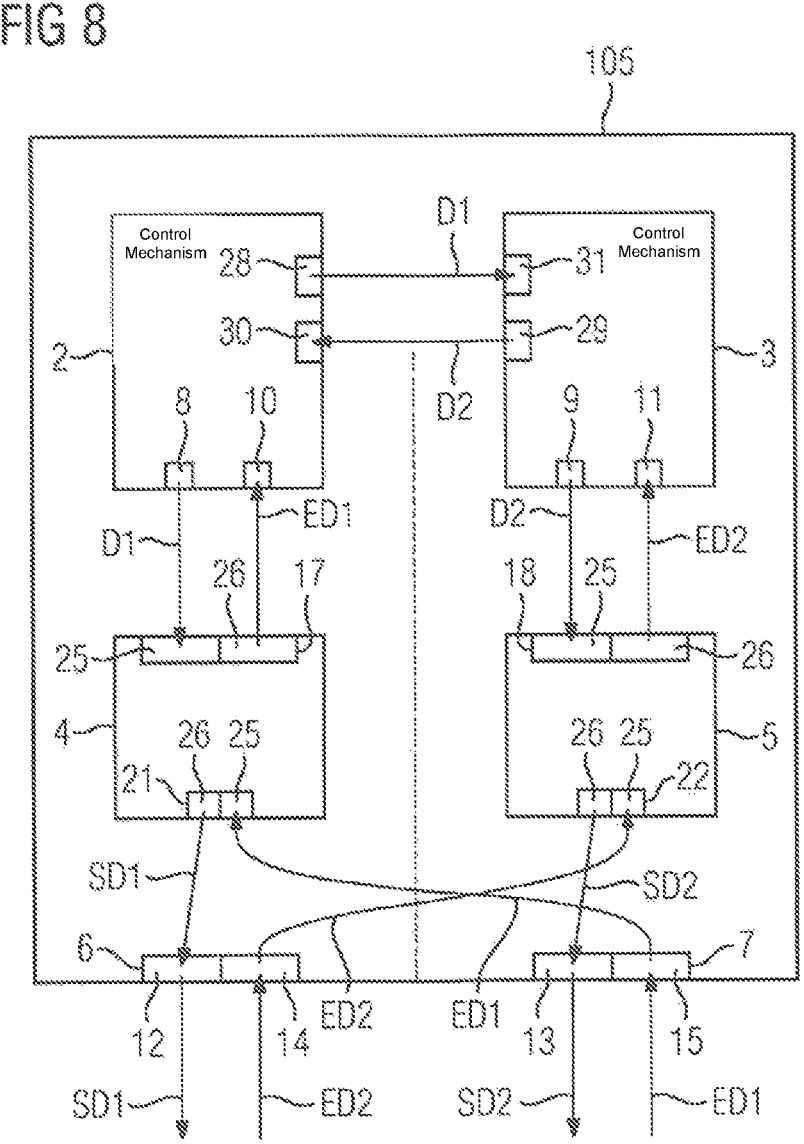

FIG. 8 shows another embodiment of a network mechanism 105. Here, the network mechanism 105 is constructed similarly to the case in FIG. 5. The network mechanism 105 has two control mechanisms 2, 3, that are communicatively connected to each other via internal transmit and receive connectors 28, 29, 30, 31. Therefore, data D1, D2 can be exchanged with each other. A switch mechanism 4, 5 is assigned to each control mechanism 2, 3. The network mechanism 105 has a first physical port 6 with a transmitted and a receive connector 12, 14 and a second physical port 7 with a transmitted and a receive connector 13, 15.

The two switch mechanisms 4, 5 have in each case two switch ports 17 and 21 and 18 and 22. Each switch port is equipped with a transmit connector 26 and a receive connector 25. In addition, the control mechanisms 2, 3 in each case have an internal transmit connector 8, 9. The internal transmit connector 8 of the first control mechanism 2 is coupled to the receive connector 25 of the switch port 17 of the first switch mechanism 4. The internal transmit connector 9 of the second control mechanism 3 is coupled to the receive connector 25 of the switch port 18 of the second switch mechanism 5. The transmitted data D1, SD1 of the first control mechanism 2 go via the first physical port 6 to a respective communication medium and the transmitted data D2, SD2 of the second control mechanism 3 go via the second physical port 7 into the transmission medium. Therefore, the transmit connector 26 of the switch port 21 is connected to the transmit connector 12 of the first physical port and the transmit connector 26 of the switch port 22 is connected to the transmit connector 23 of the second physical port 7.

The receive paths for data ED1, ED2 received by a transmission medium are routed crosswise to the respective other switch mechanism 4, 5. Therefore, the external receive connector 14 of the first physical port is coupled to the receive connector 25 of the switch port 22 of the second switch mechanism 5. The external receive connector 15 of the second physical port 7 is coupled to the receive connector 25 of the switch port 21 of the first switch mechanism 4. The switch mechanisms 4, 5 are set up such that data received at the same switch port are sent again to the associated transmit connector. This results in a physically complete separation of the two ring directions and efficient utilization of corresponding switch modules.

Figure 19:
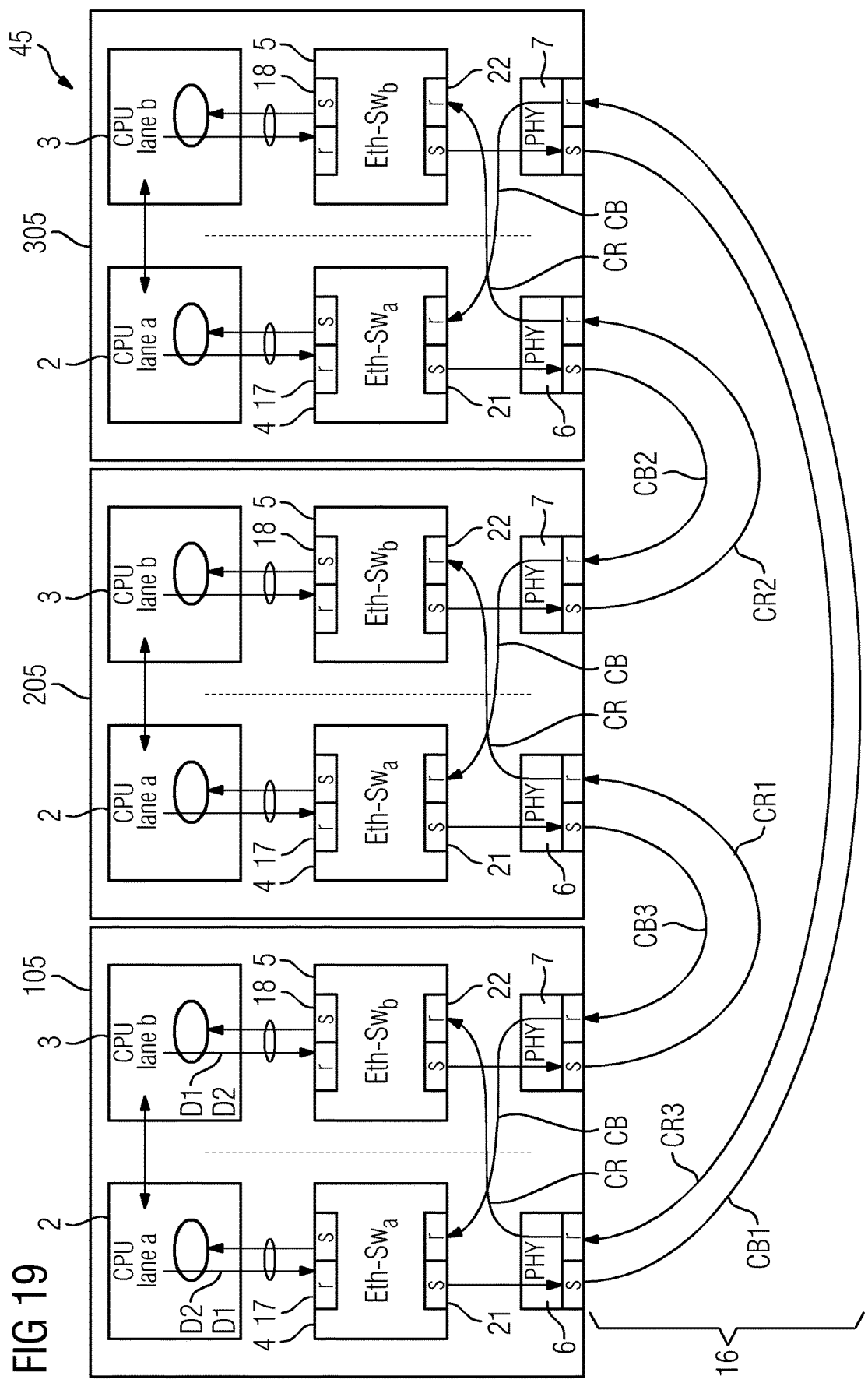

The resulting network arrangement 45 can be identified in FIG. 19. The ring CB1, CB2, CB3 forms as a communication path for lane A and the communication path of the ring for lane B with the segments CR1, CR2, CR3. The direct coupling between the CPUs 2, 3 permits the complete physical separation of the two ring directions. This means that interference with one of the CPUs 2, 3 or switch mechanisms 4, 5 never simultaneously results in the collapse of both ring directions. If, for example, the CPU 2 fails, data can still be supplied by CPU 3. An error in the form of a babbling idiot is also easy to manage since maximum one of the ring directions will be affected. If, for example, a switch mechanism 4 is defective and sends meaningless data with a high bandwidth, the ring direction CB or the lane A exclusively would be affected. Despite this, data exchange can still take place within the network 45 via the ring CR (lane B).

Substantially, the physical independence of the ring directions and hence redundantly possible communication paths and data in the network result from the crossover data connections within the network mechanisms. However, it is also possible to provide the data, for example, with the aid of specially adapted cables and sockets, which are attached to the physical ports of simple network mechanisms.

FIG. 20 shows an alternative embodiment of a network arrangement 46. Here, network mechanisms 106, 206, 306 are indicated each comprising a first and second control mechanism or CPU 2, 3, an assigned switch mechanism 4, 5 in each case and two conventional physical ports 6, 7, 32, 33 for each switch mechanism 4, 5 or control mechanism 2, 3. The physical ports 6, 7, 32, 33 can be attached via commercially available plug, for example according to a base-T or F-standard or with the aid of RJ45 jacks.

Here, the switch mechanisms 4, 5 have switch ports 19, 20, which are coupled to each other and enable communication between the two lanes A and B. The respective CPU 2, 3 is coupled to the switch mechanism 4, 5 via switch ports 17, 18. In addition, each switch mechanism 4 has two switch ports 21, 23 and 22, 24, which are in each case coupled to a pair of physical ports 6, 32 and 7, 33.

In order to achieve a crossover of the data paths with respect to the received data for the respective CPU, the network cables 34 used are embodied such that, for example, transmitted data go from the physical port 6 via the branch CB1 to the physical port 32 of the network mechanism 306. Hence, it is achieved that with a similar crossover within the network cable 34 from the physical port 6 of the network mechanism 306 to the physical port 32 of the network mechanism 206 (segment CB2) and from the physical port 6 of the network mechanism 206 to the physical port 32 of the network mechanism 106 (segment CB3), physical mechanisms of lane A are used exclusively.

This results in complete physical separation of lane B, which is achieved by the crossover and cabling of the physical ports 33 of the network mechanism 106 to the physical port 7 of the network mechanism 206 (segment CR1), the physical port 33 of the network mechanism 206 to the physical port 7 of the network mechanism 306 (segment CR2) and the physical port 33 of the network mechanism 306 to the physical port 7 of the network mechanism 106 (segment CR3).

For example, corresponding cables 34 can be provided, which implement a corresponding assignment of the network branches CB1-CB3 and CR1-CR3. A corresponding crossover can also be achieved by the provision of corresponding standard plugs with an internally changed PIN assignment. Overall, the crossover cabling and the crossover internal wiring in the network mechanism result in the physical separation of two communication rings operating redundantly within a single ring-shaped physical network.

Combinations of the suggested measures for crossover data communication are also conceivable. It is also possible to use simple network mechanisms, which do not comprise redundant control mechanisms and additional switch mechanisms in a network arrangement. It is also possible to couple a plurality of ring structures to each other. It is to a large extent possible to use standard components, which are only adapted to match the embodiment of the suggested topology.

The depictions of the network arrangements 40-46 substantially indicate operating situations with which the control mechanisms or CPUs 2, 3 of the in each case first network mechanism 100, 102, 103, 104, 105, 106 or 110 generates data and sends it into the network. During the further operation, the other network mechanisms also generate and send, for example, their control or sensor data, which are then present consistently and redundantly in the network.

If data are transmitted between lanes with the aid of switch mechanisms, preferably bandwidth limitation is performed for the preventive treatment of errors situations involving babbling idiots.

Although aspects of the invention were illustrated and described in more detail by the exemplary embodiments, the invention is not restricted by the disclosed examples and other variations can be derived by the person skilled in the art without departing from the protective scope of the invention.

What is claimed is:

1. A network mechanism for a communication network, comprising:
   a first control mechanism,
   a second control mechanism,
   a first physical port assigned to the first control mechanism and a second physical port assigned to the second control mechanism,
   wherein the first physical port and the second physical port are configured to receive data from a transmission medium and to send data, and
   wherein both:
      transmitted data from the first control mechanism are coupled by a first internal transmit connector of the first control mechanism via the first physical port into the transmission medium and received data arriving at the second physical port are routed to a first internal receive connector of the first control mechanism so that data received at the second physical port is not routed to the second control mechanism, and
      received data arriving at the first physical port are routed to a second internal receive connector of the second control mechanism and transmitted data from the second control mechanism are coupled by a second internal transmit connector of the second control mechanism via the second physical port into the transmission medium so that data received at the first physical port is not routed to the first control mechanism.

2. The network mechanism of claim 1, wherein a respective physical port comprises an external transmit connector and an external receive connector, wherein the external receive connector of the first physical port is connected directly to the internal receive connector of the second control mechanism.

3. The network mechanism of claim 1, wherein a respective physical port comprises an external transmit connector and an external receive connector, wherein the external receive connector of the second physical port is connected directly to the internal receive connector of the first control mechanism.

4. The network mechanism of claim 1, wherein a respective physical port comprises an external transmit connector and an external receive connector, wherein the external transmit connector of the first physical port is connected directly to the internal transmit connector of the second control mechanism.

5. The network mechanism of claim 1, wherein a respective physical port comprises an external transmit connector and an external receive connector, wherein the external transmit connector of the second physical port is connected directly to the internal transmit connector of the first control mechanism.

6. The network mechanism of claim 1, wherein each of the first and second physical ports comprises an external transmit connector and an external receive connector, wherein the external receive connector of the first physical port is coupled to an internal receive connector of a switch port of the second switch mechanism.

7. The network mechanism of claim 1, wherein each of the first and second physical ports comprises an external transmit connector and an external receive connector, wherein the external receive connector of the second physical port is coupled to an internal receive connector of a switch port of the first switch mechanism.

8. The network mechanism of claim 1, wherein each of the first and second physical ports comprises an external transmit connector and an external receive connector, wherein the external transmit connector of the first physical port is coupled to an internal transmit connector of a switch port of the second switch mechanism.

9. The network mechanism of claim 8, wherein each of the first and second physical ports comprises an external transmit connector and an external receive connector, wherein the external transmit connector of the second physical port is coupled to an internal transmit connector of a switch port of the first switch mechanism.

10. The network mechanism of claim 5, wherein at least one internal transmit connector of a switch port of a switch mechanism is coupled to a receive connector of a switch port of the same switch mechanism.

11. The network mechanism of claim 5, wherein at least one of the first and second switch mechanisms is configured such that data received at an internal receive connector of the switch port are sent to the internal transmit connector of the same switch port.

12. The network mechanism of claim 5 wherein the switch port coupling the first and second switch mechanisms to each other has a reduced bandwidth as compared with respective bandwidths of the first and second physical ports.

13. The network mechanism of claim 5, wherein at least one of the first and second switch mechanisms is configured to route data received by the control mechanism communicatively coupled to the switch port at an internal receive connector of the switch port to an internal transmit connector of a switch port of the at least one switch mechanism, which is connected to an internal receive connector of a switch port of the other switch mechanism or an internal receive connector of the other control mechanism.

14. The network mechanism of claim 13, wherein the internal receive connector and the internal transmit connector of the at least one switch mechanism belong to the same switch port of the at least one switch mechanism.

15. The network mechanism of claim 1, wherein each of the first and second control mechanisms comprises a further internal transmit connector and an internal receive connector, wherein the control mechanisms are directly communicatively connected to each other.

16. The network mechanism of claim 1, wherein the first control mechanism is configured to generate first data and the second control mechanism is configured to generate second data, wherein the first data and the second data are linked to each other by a prespecified coding.

17. The network mechanism of claim 1, wherein the first control mechanism, the first switch mechanism, and the first physical port form a first individual integrated circuit or module, and wherein the second control mechanism, the second switch mechanism, and the second physical port form a second individual integrated circuit or module.

18. The network mechanism of claim 1, wherein at least one of the external transmit connector and the external receive connector is configured to attach at least one twisted-pair cable.

19. The network mechanism of claim 1, wherein the physical port is configured to attach at least one optical waveguide.

20. The network mechanism of claim 1, wherein the network mechanism is configured for use in an Ethernet protocol environment according to the IEEE 802.3 Standard in a switched network.

21. A network arrangement comprising:
a plurality of network mechanisms including a first network mechanism and a second network mechanism communicating through a transmission medium, each network mechanism comprising:
  a first control mechanism and a first physical port assigned to the first control mechanism, and
  a second control mechanism and a second physical port assigned to the second control mechanism,
  wherein both:
    transmitted data from the first control mechanism are coupled by a first internal transmit connector of the first control mechanism via the first physical port into the transmission medium and received data arriving at the second physical port are routed to a first internal receive connector of the first control mechanism, and
    received data arriving at the first physical port are routed to a second internal receive connector of the second control mechanism and transmitted data from the second control mechanism are coupled by a second internal transmit connector of the second control mechanism via the second physical port into the transmission medium,
  wherein the plurality of network mechanisms are connected to define two communication rings that communicate data is opposite directions from each other, with each communication ring routing data through the plurality of network mechanisms,
  wherein for the first communication ring, which communicates data in a first direction, the first physical port assigned to the first control mechanism in each respective network mechanism is communicatively coupled with the aid of a first transmission medium to the second physical port assigned to the second control mechanism in another one of the plurality of network mechanisms so that data received at the first physical port is not communicated to the first control mechanism, and
  wherein for the second communication ring, which communicates data in a second direction opposite the first direction, the second physical port assigned to the second control mechanism in each respective network mechanism is communicatively coupled with the aid of a second transmission medium to the first physical port assigned to the first control mechanism in another one of the plurality of network mechanisms mechanism so that data received at the second physical port is not communicated to the second control mechanism.

22. The network arrangement of claim 21, wherein each of the first and second network mechanisms further comprises:
a first physical port assigned to the first control mechanism for sending data,
a further first physical port assigned to the first control mechanism for receiving data,
a second physical port assigned to the second control mechanism for receiving data, and
a further second physical port assigned to the second control mechanism for sending data, and
wherein the first physical port of the first network mechanism is coupled to the first further physical port of the second network mechanism and the second further physical port of the second network mechanism is coupled to the second physical port of the first network mechanism.

23. A method for operating a network arrangement comprising a plurality of network mechanisms including a first network mechanism and a second network mechanism, each network mechanism comprising a first control mechanism and a first physical port assigned to the first control mechanism, and a second control mechanism and second physical port assigned to the second control mechanism,
  wherein the plurality of network mechanisms are connected to define two communication rings that communicate data in opposite directions from each other, with each communication ring routing data through the plurality of network mechanisms,
  wherein for the first communication ring, which communicates data in a first direction, the first physical port assigned to the first control mechanism in each respective network mechanism is communicatively coupled with the aid of a first transmission medium to the second physical port assigned to the second control mechanism in the second network mechanism so that data received at the first physical port is not communicated to the first control mechanism, and
  wherein for the second communication ring, which communicates data in a second direction opposite the first direction, the second physical port assigned to the second control mechanism in each respective network mechanism is communicatively coupled with the aid of a second transmission medium to the first physical port assigned to the first control mechanism in the second network mechanism so that data received at the second physical port is not communicated to the second control mechanism, the method comprising:
  at the first physical port of the first network mechanism, for data communicated via the first communication ring in the first direction, rerouting data received by the transmission medium to the second physical port of the first network mechanism and sent from the second physical port to the transmission medium and subsequently to the first physical port of the second network mechanism, and
  at the second physical port of the first network mechanism, for data communicated via the second communication ring in the second direction, rerouting data received by the transmission medium to the first physical port of the first network mechanism and sent from the first physical port to the transmission medium and subsequently to the second physical port of the second network mechanism.

24. The method of claim 23 further comprising:
generating first data by the first control mechanism and generating second data by the second control mechanism, wherein the first data and the second data are linked to each other by a prespecified coding;
transmitting the first data from the first control mechanism to the second control mechanism and the transmission of the second data from the second control mechanism to the first control mechanism;
sending the first data and the second data via a first communication path from the physical port of the first control mechanism to the physical port of the second control mechanism; and
sending the first data and the second data via a second communication path from the physical port of the second control mechanism to the physical port of the first control mechanism;
wherein the data of the first and of the second communication paths travel through the same network mechanisms in opposite directions.

25. The method of claim 23, further comprising comparing the first data with the second data in at least one of the first and second control mechanisms to determine a comparison result; and rendering the network mechanism passive as a function of the comparison result.

26. A non-transitory computer program product, which initiates the performance of a method as claimed in claim 23 on one or more program-controlled mechanisms.

27. A non-transitory data carrier with a stored computer program with commands, which initiates the performance of a method as claimed in claim 23 on one or more program-controlled mechanisms.

\* \* \* \* \*